US008717676B2

(12) United States Patent
Rinko

(10) Patent No.: US 8,717,676 B2
(45) Date of Patent: May 6, 2014

(54) LIGHT OUTCOUPLING STRUCTURE FOR A LIGHTING DEVICE

(75) Inventor: Kari Rinko, Helsinki (FI)

(73) Assignee: Modilis Holdings LLC, Wilmington, DE (US)

( * ) Notice: Subject to any disclaimer, the term of this patent is extended or adjusted under 35 U.S.C. 154(b) by 231 days.

(21) Appl. No.: 11/980,372

(22) Filed: Oct. 31, 2007

(65) Prior Publication Data

US 2008/0225393 A1   Sep. 18, 2008

Related U.S. Application Data

(60) Provisional application No. 60/855,362, filed on Oct. 31, 2006.

(51) Int. Cl.
G02B 5/18 (2006.01)
F21V 5/00 (2006.01)
F21V 7/04 (2006.01)

(52) U.S. Cl.
USPC ........... 359/571; 359/573; 359/569; 362/608; 362/331

(58) Field of Classification Search
USPC ......... 359/566, 571, 574, 575, 569, 462, 573; 362/617, 626, 600, 628, 311, 608
See application file for complete search history.

(56) References Cited

U.S. PATENT DOCUMENTS

| | | | |
|---|---|---|---|
| 5,779,338 A | 7/1998 | Ishikawa et al. | |
| 5,980,054 A | 11/1999 | Fukui et al. | |
| 6,099,134 A | 8/2000 | Taniguchi et al. | |
| 6,196,691 B1 * | 3/2001 | Ochiai | 362/617 |
| 6,412,968 B1 | 7/2002 | Ohkawa | |
| 6,487,019 B2 * | 11/2002 | Hoose | 359/575 |
| 6,728,034 B1 * | 4/2004 | Nakanishi et al. | 359/566 |
| 6,786,613 B2 * | 9/2004 | Suzuki | 362/600 |
| 7,430,076 B2 * | 9/2008 | Sato et al. | 359/569 |
| 7,507,011 B2 * | 3/2009 | Ueno et al. | 362/625 |
| 7,527,416 B2 * | 5/2009 | Lin | 362/626 |

(Continued)

FOREIGN PATENT DOCUMENTS

| EP | 1016817 A1 | 7/2000 |
|---|---|---|
| EP | 1260853 A1 | 11/2002 |

(Continued)

OTHER PUBLICATIONS

International Search Report—Mar. 10, 2008.

(Continued)

Primary Examiner — Audrey Y Chang
(74) Attorney, Agent, or Firm — Lee & Hayes, PLLC

(57) ABSTRACT

A diffractive light outcoupling unit for forming a part of a directive light outcoupling system of a lighting device including a plurality of diffractive outcoupling units. The diffractive light outcoupling units each include a carrier element for accommodating a diffractive surface relief pattern, and a diffractive surface relief pattern including a plurality of consecutive diffractive surface relief forms defined on a surface area of the carrier element arranged to couple light incident on the diffractive surface relief pattern outside the carrier element via interaction involving at least two surface relief forms of the plurality of surface relief forms of the diffractive surface relief pattern so as to enhance the directivity of the coupled light. A diffractive light outcoupling system includes a plurality of diffractive light outcoupling units. A lightguide includes the outcoupling system.

26 Claims, 13 Drawing Sheets

(56) References Cited

U.S. PATENT DOCUMENTS

| | | | | |
|---|---|---|---|---|
| 7,679,826 | B2* | 3/2010 | Ezra | 359/573 |
| 7,695,179 | B2* | 4/2010 | Eichelberger | 362/620 |
| 7,738,173 | B2* | 6/2010 | Schilling et al. | 359/573 |
| 2005/0122743 | A1 | 6/2005 | Lin | |
| 2005/0213348 | A1 | 9/2005 | Parikka et al. | |
| 2005/0259939 | A1 | 11/2005 | Rinko | |
| 2006/0132914 | A1* | 6/2006 | Weiss et al. | 359/462 |

FOREIGN PATENT DOCUMENTS

| | | |
|---|---|---|
| JP | 10039302 | 2/1998 |
| JP | 2000266914 | 9/2000 |
| JP | 2003500706 | 1/2003 |
| JP | 2004319252 | 11/2004 |
| JP | 2005268201 | 9/2005 |
| JP | 2005353599 | 12/2005 |
| JP | 2006113271 | 4/2006 |
| JP | 2006114379 | 4/2006 |
| JP | 2006227347 | 8/2006 |
| WO | WO-2005/080862 A1 | 9/2005 |

OTHER PUBLICATIONS

Written Opinion of the International Searching Authority—Mar. 10, 2008.

International Preliminary Report on Patentability—Jan. 14, 2009.

Translated Chinese Office Action dated Dec. 7, 2011 for Chinese patent application No. 200780044344, a counterpart foreign application of U.S. Appl. No. 11/980,372, 19 pages.

The Chinese Office Action mailed Feb. 28, 2011 for Chinese Patent Application No. 200780044344, a counterpart foreign application of U.S. Appl. No. 11/980,372.

Translated Chinese Office Action mailed Jul. 6, 2011 for Chinese patent application No. 200780044344, a counterpart foreign application of U.S. Appl. No. 11/980,372.

The European Office Action mailed Aug. 29, 2011 for European patent application No. EP20070823223, a counterpart foreign application of U.S. Appl. No. 11/980,372, 4 pages.

Translated Russian Office Action for Russian patent application No. 2009119058, a counterpart foreign application of U.S. Appl. No. 11/980,372, 10 pages.

Translated Chinese Office Action mailed Jun. 19, 2012 for Chinese patent application No. 200780044344, a counterpart foreign application of U.S. Appl. No. 11/980,372, 23 pages.

The Extended European Search Report mailed Jun. 13, 2012 for European patent application No. 12160741.0, 6 pages.

Translated Japanese Office Action mailed Sep. 4, 2012 for Japanese patent application No. 2009535096, a counterpart foreign application of U.S. Appl. No. 11/980,372, 6 pages.

Translated Japanese Office Action mailed Mar. 12, 2013 for Japanese patent application No. 2009-535096, a counterpart foreign application of U.S. Appl. No. 11/980,372, 8 pages.

The European Office Action mailed Jun. 28, 2013 for European patent application No. 12160741.0, a counterpart foreign application of U.S. Appl. No. 11/980,372, 8 pages.

Translated Japanese Office Action mailed Oct. 8, 2013 for Japanese patent application No. 2009-535096, a counterpart foreign application of U.S. Appl. No. 11/980,372, 6 pages.

Translated Russian Office Action for Russian patent application No. 2009119058, a counterpart foreign application of U.S. Appl. No. 11/980,372, 10 pages, (Nov. 3, 2011).

* cited by examiner

|  | MARKER 1 | MARKER 2 | DIFFERENCE |
|---|---|---|---|
| DISTANCE | 15.55 μm | 22.95 μm | 7.40 μm |
| z | 6.67 μm | 0.84 μm | -5.83 μm |

LIGHT OUTCOUPLING STRUCTURE FOR A LIGHTING DEVICE

CROSS-REFERENCE TO RELATED APPLICATIONS

This application claims priority to U.S. provisional patent application 60/855,362 filed 31 Oct. 2006, the entire contents of the disclosure of which is hereby incorporated by reference.

FIELD OF THE INVENTION

Generally the invention relates to optics. In particular the invention pertains to light outcoupling and directing structures utilizing the effect of diffractive gratings.

BACKGROUND

Diffractive grating structures are fine structures (cross-sectional profile e.g. 5 microns) of a surface that condition the passage of light based on physical optics including the diffraction effect. Many known 'micro-prismatic' structures are not true diffractive structures as they are relatively large (cross-sectional profile e.g. 50 microns), whereby altering the light passage is solely based on refraction effect therein, i.e. only the principles of geometric optics are applied.

Generally refraction of light at the interface between two media is described by the Snell's law:

$$\frac{\sin\theta_i}{\sin\theta_t} = \frac{n_2}{n_1} = \frac{v_1}{v_2}, \quad (1)$$

and reflection by $\theta_i = \theta_r$,
wherein $\theta_i$, $\theta_r$ and $\theta_t$ are the incidence, reflection, and refraction angles between the normal vector to the interface and incident, reflected and refracted beams, respectively. n's and v's refer to refractive indexes of first and second media and the speed of the light in the media, respectively. See FIG. 1a for visualization. Total internal reflection may occur when light arriving from material with higher refractive index with respect to the second material meets a medium boundary at an angle larger than the critical angle with respect to the normal to the surface.

A diffraction phenomenon is often inspected via a diffraction grating that refers to a transparent or reflective surface pattern of a large number of parallel lines, i.e. grating grooves or 'slits', used to disperse light into a spectrum. A transmission grating has grooves on a transparent material. A reflection grating has grooves on a reflective coating on a surface. Light rays that pass through or reflect from such surfaces are bent as a result of diffraction. The diffraction angle depends on the light wave length λ and so-called groove 'spacing' or groove 'period' d, sometimes also called as 'pitch', according to the following (in-plane) grating equation:

$$m\lambda = d(\sin\alpha + \sin\beta_m), \quad (2)$$

wherein angles α and β refer to incidence angle and diffraction angles, respectively. The angles are in this example measured from the grating normal. 'm' refers to the diffraction order that is an integer. For a selected wavelength λ the values of m complying with $|m\lambda/d|<2$ are obviously physically realizable in view of equation 2. Order m=0 corresponds to direct transmission or specular reflection. Each groove of a grating introduces a diffraction pattern, whereby many diffraction patterns by several grooves interfere. See FIG. 1b for schematic illustration of a reflective grating, wherein grating grooves are perpendicular to the page surface and a monochromatic light beam propagates in the surface plane. Most often diffraction the grooves of the diffraction gratings have rectangular cross-section, i.e. they are binary grooves, but also trapezoidal or triangular forms are possible.

Accurate and efficient light management is continuously growing in importance. Power consumption and light pollution are both actual issues in all optical applications. The main focus in optical solutions is currently in light coupling and directing structures.

Waveguides are elements that are especially adapted to carry waves within them. In optics waveguides are often called as lightguides and they typically include dielectric material with relatively high refractive index. When the waveguide is placed in an environment with lower refractive index the guide advantageously carries the waves according to the principles of total internal reflection. Lightguides include optical fiber, glass and e.g. different films.

Diffractive gratings such as binary grooves may be utilised in optical applications for light outcoupling and scattering. However, merely using the diffractive grating grooves doesn't automatically guarantee tolerable performance by any standard as to be reviewed hereinafter.

FIG. 2 discloses a scenario visualizing a cross-section of an elongated lightguide 202 whereto a light source such as a LED (Light Emitting Diode) 204 has been attached. Major part of the light is outcoupled from the lightguide top surface for non-preferred and non-suitable direction, when the incident angle thereof in relation to the media interface normal is smaller than the critical angle. As seen from the conoscope figure the light output emanating 206 from the lightguide 202 is neither particularly uniform nor directional. Such output is possible to attain by a number of microstructures provided to the lightguide bottom or top surface to alter the light path so that a part of light previously propagated in the guide with total reflection changes its direction and incident angle whereby it is transmitted outside the lightguide upon contacting the media interface.

FIG. 3 discloses a corresponding situation wherein a number of solitary, i.e. single, blazed grating grooves 302 have been positioned on a lightguide bottom surface 304 for outcoupling light. Because a blazed grating groove is particularly incidence angle selective and sensitive structure, the directive coupling efficiency of the grating groove is strongly related to the incidence angle of light, which is also the case with the conical angle, i.e. the angle between the incident light and the plane of FIG. 3 (XY) parallel to the grating normal. Thus directive outcoupling is achieved only with a very limited range of incidence angles in order to achieve narrow vertical outcoupling angles with still reasonable waveguide output coefficient, i.e. the preferred efficiency parameter determinable from the relationship between the incident and properly outcoupled light. With other incidence angles the light passes through the blazed grating structure and propagates further, either inside or outside the lightguide, for example. Major part of this light finally leaks out from the lightguide or is outcoupled at a non-preferred angle resulting non-directive output light and thus in many applications inferior lighting effect and low light coupling efficiency. One prior art solution with solitary blazed grating grooves, wherein the distance between consecutive grooves is at least several tens of microns, is disclosed in EP 1260853.

Notwithstanding the various prior art solutions, the output from the light emitting surfaces of lightguides or other lighting devices was not found fully adequate what comes to the directivity and uniformity of the outcoupled light. The outcoupled light was more or less Lambertian and non-uniform.

To further analyze the performance of diffractive grating grooves, several tests and simulations were conducted concerning the performance of solitary microprism-type grating grooves and differences between electromagnetic (~physical optics) and ray tracing approaches when the grating grooves were located at a lightguide bottom as shown in FIG. 3. The following conclusions were drawn after analyzing interaction of light incident on a solitary grating groove or a micro-prism with 45° blaze angle thus having the shape of an equilateral triangle. In the test set-up light is incident onto a microprism-type groove at angle α ranging from 60° to 90°, where the angle α is the angle of incident light in the XY plane in relation to a vertical line. The angle θ is the conical angle, i.e. the angle of light incidence in the XZ plane. At θ=0° the light propagates perpendicularly to the groove, in the XY plane.

The aforesaid microprism-type grooves are generally suited to output light through the lightguide's top surface, if the angle α is in the range 87°<α<132° (corresponding to incidence angle 42°<γ<87° relative to the groove normal). With smaller angles the light will leave the lightguide through the grooves with only a small portion of light energy reaching the lightguide's top surface. The optimum angle α is 90°. When the angles α range from 80° to 100°, the output angle from waveguide is substantially no greater than 15°. It was further found that for a relatively narrow range of angles α, e.g. from 87° to 100°, while recalling that for angles less than 87° some light passes through the diffractive groove, the waveguide output coefficient is clearly over 0.90, when the coefficient is defined as a product of the groove's reflectance by the transmittance of the waveguide's top surface. Deviation of θ from zero leads to an increase in the absolute value of the output angle φ. For θ greater than 10° it is practically impossible to get the light outcoupled from the lightguide top at angles smaller than 15°. A solitary groove is thus not particularly suitable for outcoupling light with wide incidence angle perpendicularly to the exit surface.

By comparing the electromagnetic modeling incorporating e.g. the polarization phenomenon with the ray tracing modeling (geometric optics) it was found that the two approaches may provide rather equal results concerning the propagation direction of light and light output coefficient when the angle θ is not especially large, e.g. <30°. However, electromagnetic modeling provides a higher light output coefficient due to diffractive phenomenon, especially in connection with small and large incidence angles.

SUMMARY OF THE INVENTION

The objective of the embodiments of the present invention is to at least alleviate aforesaid drawbacks in prior art arrangements.

The objective may be achieved via a solution of the present invention that includes a diffractive surface relief structure providing improved, efficient control over the directivity of coupled light and can typically be modified, duplicated and integrated with other entities to form at least part of a diffractive outcoupling system of a lighting device.

Accordingly, in one embodiment of the present invention, a diffractive light outcoupling unit for forming a part of a directive light outcoupling system of a lighting device including a plurality of diffractive outcoupling units, includes a carrier element for accommodating a diffractive surface relief pattern, and a diffractive surface relief pattern including a plurality of consecutive diffractive surface relief forms defined on a surface area of the carrier element, wherein the form period may be about 10 microns or less, arranged to couple light incident on the diffractive surface relief pattern outside the carrier element via interaction involving at least two surface relief forms of the plurality of consecutive diffractive surface relief forms of the diffractive surface relief pattern so as to enhance the directivity of the coupled light.

In one embodiment the plurality of consecutive diffractive outcoupling units define a number of blazed or slanted grating groove, recess or protrusion profiles on the surface area. The blazed groove profiles can be also called microprism-type, triangular or saw-tooth profiles. Slanted groove profiles may include parallelograms and trapezoidal forms, for example.

An embodiment of the present invention incorporates interaction between consecutive diffractive surface relief forms of the outcoupling unit so that the overall coupling efficiency in the predetermined direction, i.e. light directivity, can be increased concerning the outcoupling system including a plurality of outcoupling units, not just a single outcoupling unit and its directivity. Each optical design may generally include a plurality of similar or different outcoupling units.

Typically, the desired outcoupling angle is, depending on the embodiment, narrow relative to the incident angle so that a wider range of incident angles can be effectively outcoupled to a narrower range of outcoupling angles by utilizing the above interaction of surface relief forms. The efficiency of the outcoupling unit can be determined according to a selected criterion that relates to the amount (e.g. light flux/intensity) of light outcoupled within the desired outcoupling angle in relation to the incident light. So the incident light is at least partly outcoupled as desired, whereas some leakage or undesired outcoupling angles may still occur.

The aforesaid unit can be duplicated, optionally modified in size and shape, etc., and positioned in a number of predetermined locations of a lightguide or another entity to form at least a part of an outcoupling system thereof and to direct incoupled, incident light towards one or more predetermined directions in the lightguide or other entity. The carrier element or 'carrier medium' (substrate) of the system may be capable of transporting light and include a plurality of smaller, optically transparent carrier elements of outcoupling units whereto the diffractive surface relief patterns of the units and other optical and/or diffractive elements are formed. When the carrier element of the diffractive surface relief pattern or of the whole outcoupling system is not used as a lightguide, it shall still include material suitable for carrying the diffractive pattern, whereupon the incident light arrives and may be outcoupled without entering the carrier element itself.

The aforesaid embodiment of the outcoupling unit can be thus considered as a functional building block of the overall outcoupling system. The total number of consecutive diffractive surface relief forms in the diffractive surface relief pattern, i.e. diffractive structure, of the light outcoupling unit may vary from few, e.g. 2-5 forms, to several tens of forms depending on the application. How the number can be determined, is analyzed hereinafter in more detail in connection with the detailed description of embodiments.

Considering the physical positioning and appearance of the diffractive outcoupling units on a carrier substrate in general, the unit may include a functionally separable surface area that may also be visually distinguishable and separable from the rest of the surface of the carrier element by the borders of included surface relief forms in relation to surrounding carrier element material and optional surface relief forms hereof.

The separable surface area of a diffractive light outcoupling unit further typically includes at least one diffractive surface relief pattern including at least two consecutive diffractive surface relief forms. These at least two consecutive forms are typically positioned and aligned so as to effectively couple light via the described interaction. For example, such interaction-providing alignment may refer to two substantially parallel forms such as two grating grooves having a blazed profile. At least two consecutive forms of a diffractive surface relief pattern of a diffractive light outcoupling unit may in some embodiments may be aligned differently, e.g. with five or ten degrees difference in alignment, in contrast to the absolutely parallel forms.

The aforesaid separable surface area of a diffractive outcoupling unit may also be possible to functionally and/or visually split into multiple sub-areas, e.g. first and second surface areas, each including a different or at least differently aligned surface relief pattern. All such surface relief patterns, however, do not necessarily include diffractive surface relief forms as also other forms are possible. A surface (sub-)area may also be substantially free of surface relief forms. In the case of multiple surface relief patterns or at least multiple surface areas constituting a functional outcoupling entity, an aggregate outcoupling unit has been created.

The size, alignment, surface relief forms, shape, and location of the outcoupling units may be adjusted based on the desired overall efficiency of the system in one or more predetermined directions; indeed, one outcoupling system may also include a plurality of at least functionally separable surface areas with diffractive forms, the areas having different, predetermined coupling directions. Such an aggregate outcoupling system may be thus considered to be constructed from a plurality of light outcoupling subsystems.

Accordingly, in one embodiment the carrier element may include a first surface area and a second surface area adjacent to the first surface area, wherein the first surface area includes the above diffractive surface relief pattern and the second surface area is either free of diffractive elements or including one or more diffractive elements different (shape, size, etc) or at least aligned different from the relief forms of the first diffractive structure of the first surface area. Thus, different kinds of aggregate units may be formed. The second surface area may be used to support, adjust and/or fine-tune the outcoupling from the first surface area, for example. The diffractive elements of the second surface area may also be formed utilizing surface relief forms.

In accordance with a further embodiment of the present invention, a diffractive light outcoupling system includes
  a carrier element including a plurality of diffractive outcoupling units,
wherein each unit includes a diffractive surface relief pattern including a plurality of consecutive diffractive surface relief forms, such as blazed or slanted grating profiles, defined on a surface area of the carrier element, wherein the form period is typically about 10 microns or less, arranged to couple light incident on the diffractive surface relief pattern outside the carrier element via interaction involving at least two surface relief forms of the plurality of consecutive diffractive surface relief forms so as to enhance the directivity of light coupled by the plurality of diffractive light outcoupling units of the outcoupling system.

Considering the outcoupling system design in general, the design parameters may dictate the allowed shape and size of the carrier element, for example. Further, the design parameters may define the type of the used light source, the location and alignment of the light source, and the overall number of light sources, if a plurality is to be, or can be, used. One or more of such design parameters may be initially non-fixed, being thus adjustable during the design process. The parameters may set a target outcoupling efficiency in a predetermined direction, which may enable achieving such efficiency by one or more alternative design options, wherein the location, form, alignment and optic forms of the diffractive structures of selected outcoupling units may differ between the alternative designs and even within the designs, all designs may still fulfill the predetermined parameters. Naturally, the final performance of acceptable designs may still vary.

In accordance with additional embodiments of the present invention, a lightguide includes:
  an incoupling system for coupling light into the lightguide from a light source,
  an optically substantially transparent carrier element for transporting light, and
  an outcoupling system including a plurality of diffractive outcoupling units, wherein each unit includes a diffractive surface relief pattern including a plurality of consecutive diffractive surface relief forms, such as blazed or slanted grating profiles, defined on the carrier element, wherein the form period is typically about 10 microns or less, arranged to couple light incident on the diffractive surface relief pattern outside the carrier element via interaction involving the one and at least one another surface relief form of the plurality of surface relief forms of the diffractive surface relief pattern so as to enhance the directivity of light coupled by the plurality of diffractive light outcoupling units of the outcoupling system.

In one embodiment the lightguide is arranged to couple light incident on the diffractive surface relief pattern so that at least some of the light rays incident on one of the plurality of diffractive surface relief patterns within a predetermined incident angle and a predetermined conical angle are at least partly coupled through the desired exit area to leave the carrier element within a predetermined outcoupling angle relative to a predetermined direction via interaction involving at least two diffractive surface relief forms of the plurality of diffractive surface relief forms to enhance the effective control of light directivity.

In an embodiment a surface area over which the outcoupling system may be configured to extend further includes locations being either free of diffractive elements or including one or more diffractive elements different or at least aligned different from the diffractive surface relief forms of the diffractive surface relief patterns.

Thus, the area over which the aforesaid outcoupling system of the lightguide may extend is typically not fully covered, with 100% density, by the exactly similar and similarly aligned aforementioned diffractive structures as there may be other structures, differently aligned structures or structure-free areas within the area. Typically, the other structures also include diffractive surface relief patterns. Consequently, further controllability may be obtained instead of just filling the whole extended area with maximally dense grating, for example.

Depending on the particular embodiment the predetermined exit area, e.g. a lightguide top surface, and area over which the outcoupling system extends may be separate areas or at least partially overlapping areas.

The incoupling system may include means, such as a grating structure, a distributor, a diffuser, etc., for conveying light from a light source to the lightguide. It may further include one or more light sources, such as a LED or a fluorescent or incandescent lamp, or a plurality of any one or more of those.

The utility of embodiments of the present invention may arise from a plurality of issues depending on each particular embodiment. Generally speaking, the particular coupling solution may be suitable for many kinds of optical applications in order to control the light accurately and efficiently. The diffractive pattern of the aforementioned unit is typically small, such as about 20 μm (length)×about 20 μm (width) with a period and depth (or height) of about 5 μm, and provides high degree of modulation. For example, blaze angles of the grooves may be varied in order to control light outcoupling angles and light distribution of the related lighting device such as a lightguide, i.e. radiation pattern, with small loss and leakage. The presented outcoupling solution may advantageously provide higher light outcoupling efficiency and better light directivity than solitary groove solutions, because a larger range of incidence angles can be managed and outcoupled efficiently with the help of special outcoupling units ("interaction"). In many applications, e.g. in display lighting of laptop computers and mobile terminals, good efficiency and directivity of light is typically preferred over Lambertian light due to e.g. security and privacy issues; by the current invention outcoupled rays can be collimated to a desired direction so that the object to be illuminated is seen by an external viewer only within a predetermined angle. As a single outcoupling unit typically is efficient, a larger modulated illumination surface corresponding to a plurality of outcoupling units is efficient as well. Diffractive structures according to one or more embodiments of the present invention may also be utilized in various opto-electronic applications.

The inventive outcoupling structures of embodiments of the present invention are usually less sensitive to variation in the incidence angle and wavelength than conventional solutions, being rather efficient outcouplers for a wide range of incidence angles and wavelengths, and they may further provide enhanced controllability to the directivity of light outcoupling also in relation to different wavelengths (e.g. for quasi-monochromatic light). The outcoupling unit may be used in forming both front and/or back lighting arrangements, for example. In front light applications, it is typically beneficial that the lighting itself does not produce visible artifacts to the viewing direction; the outcoupling unit of the present invention provides constructing precise, internally dense, but en bloc practically imperceptible, local diffractive elements that effectively outcouple the light towards the lighting target. Further, in many applications back-reflectors may be conveniently omitted due to the use of an efficient, diffractive structure in accordance with particular embodiments of the current invention.

Embodiments of the present invention may also enable avoiding the use of conventional prismatic Brightness Enhancement Films (BEF) sheets that are expensive, relatively thick and coupling-wise lossy elements for concentrating light into a desired direction. In the context of the present invention, various additional diffractive structures, such as diffusers, may be integrated in the carrier element. The outcoupling unit in accordance with an embodiment of the present invention may already enhances the controllability of light directivity as such, but optionally further surface relief patterns can be used for additional control in order to form e.g. round or elliptical illumination pattern.

The length of the surface relief forms, such as grating grooves, may vary from small recesses to longer (e.g. between 20 μm and even several mm) continuous grooves. Forms within an outcoupling unit can have different length, but organized in such a manner these still create a functional light outcoupling unit, e.g. a pixel. The cross-sectional shape of forms, i.e. profile, can be controlled to concentrate the diffracted energy as desired, for example. In addition to or instead of grooves propagating straight on the carrier element surface, curved grooves or other forms may be utilized depending on amount and placement of light sources.

The illumination element according to an embodiment of the outcoupling unit of the present invention may be made thin and electrically/optically efficient, being therefore applicable in low-power solutions, such as watches, portable computers, mobile terminals and personal digital assistants (PDA) for display and/or keypad/keyboard lighting. The efficient control of light directivity of an illumination element can be utilized as well in street lamps, traffic sign, signal lamps, automotive illumination, opto-electronic and general lighting applications.

The expression "a number of" used herein refers to any positive integer starting from 1, i.e. 1, 2, 3, etc.

The expression "form period" refers to the distance from a beginning of a form (profile), e.g. a grating groove, to a beginning of a consecutive form (profile). In the context of grating grooves a corresponding term "groove period" is often used.

The expressions "depth" and "height" are hereinafter equally used notwithstanding the actual nature of the associated diffractive surface relief form, i.e. whether it is, for example, a recession or a protrusion on a carrier element.

Various embodiments of the invention are disclosed in the attached dependent claims.

BRIEF DESCRIPTION OF THE RELATED DRAWINGS

FIG. 1a illustrates the Snell's law and refraction of light.
FIG. 1b illustrates a diffraction grating.
FIG. 2 is a sectional view of an elongated lightguide whereto a light source has been connected.
FIG. 3 illustrates light outcoupling from a number of solitary grating grooves defined on a lightguide bottom.
FIG. 4a illustrates a planar view of an embodiment of a lightguide according to the present invention including a plurality of outcoupling units.
FIG. 4b is a sectional view of a diffractive outcoupling unit according to one embodiment of the invention.
FIG. 4c is a three-dimensional view of a diffractive outcoupling unit as a part of an outcoupling system according to one embodiment of the invention.
FIG. 4d discloses examples of positioning for diffractive outcoupling units in relation to the outcoupled light and carrier element.
FIG. 5a illustrates an embodiment of a diffractive outcoupling unit wherein blazing angles vary between grating grooves.
FIG. 5b illustrates various possible embodiments of groove profile configurations within a diffractive outcoupling unit.
FIG. 6a is planar view of a light outcoupling system having outcoupling units defined thereon in a pseudo-random manner.
FIG. 6b is a planar view acquired with a microscope of a regular surface pattern formed by diffractive structures of a plurality of outcoupling units according to an embodiment of the invention on a carrier element surface.
FIG. 6c is a planar view of two embodiments for diffraction element shapes.
FIG. 6d is a planar view acquired with a microscope of a surface relief pattern of an outcoupling unit according to an embodiment of the invention on a carrier element surface.

DETAILED DESCRIPTION OF EMBODIMENTS OF THE INVENTION

Figure 1A:
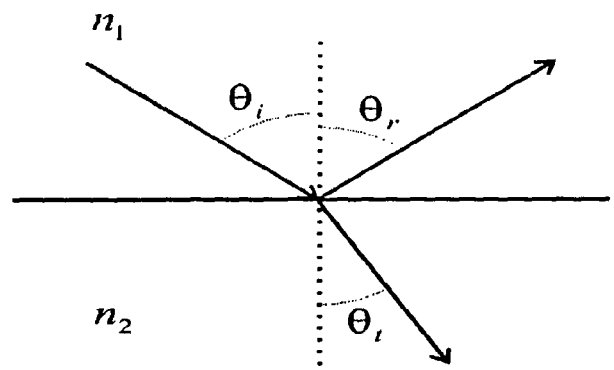
Figure 1B:
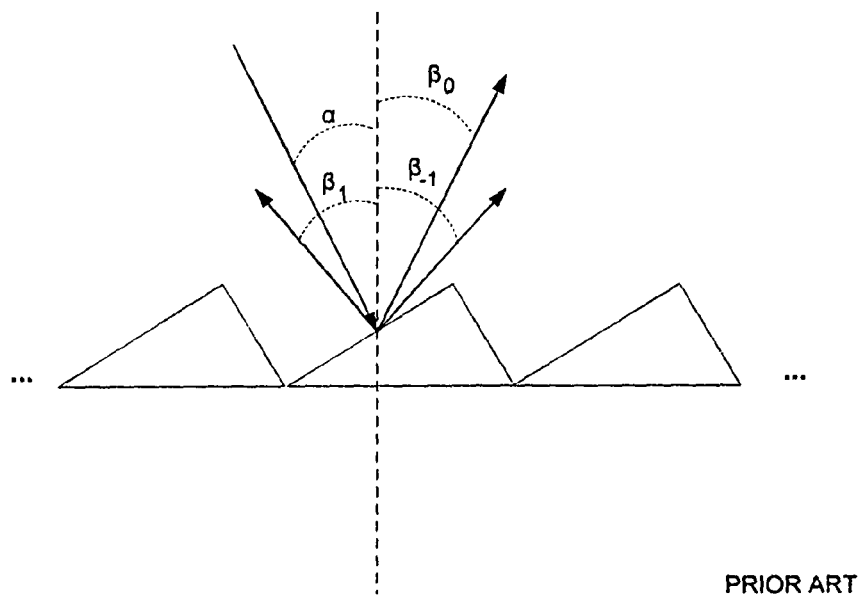
Figure 2:
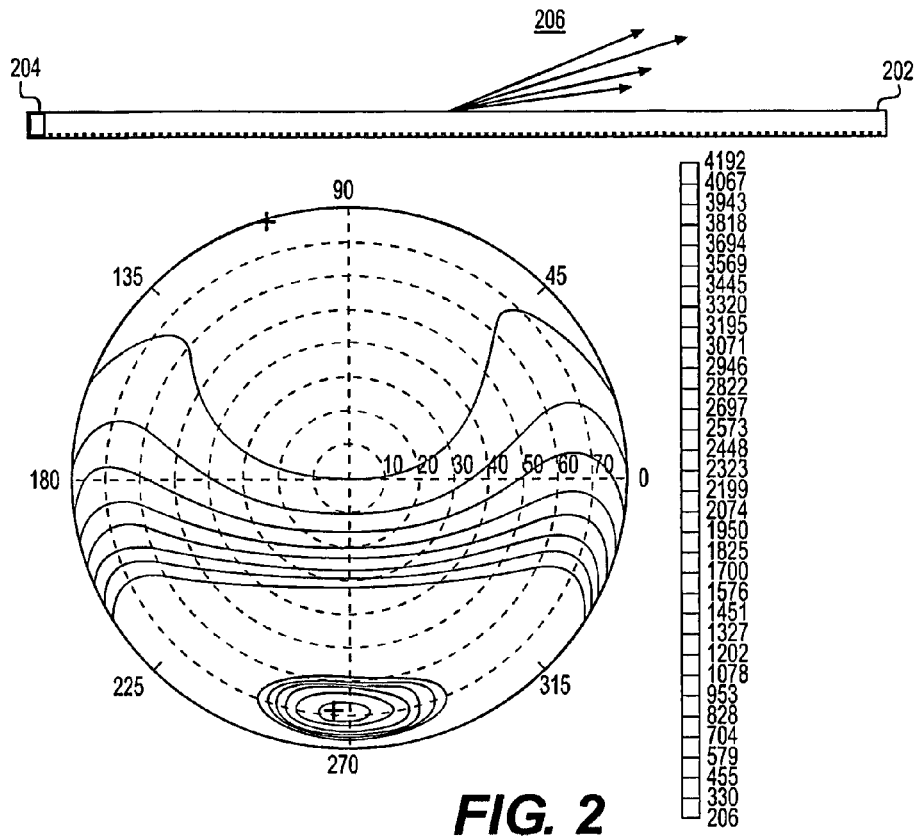
Figure 3:
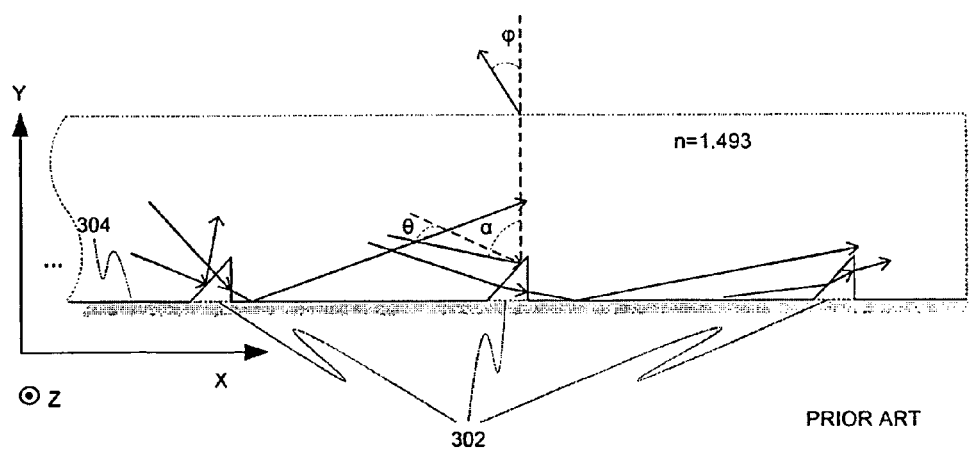
Figure 4A:
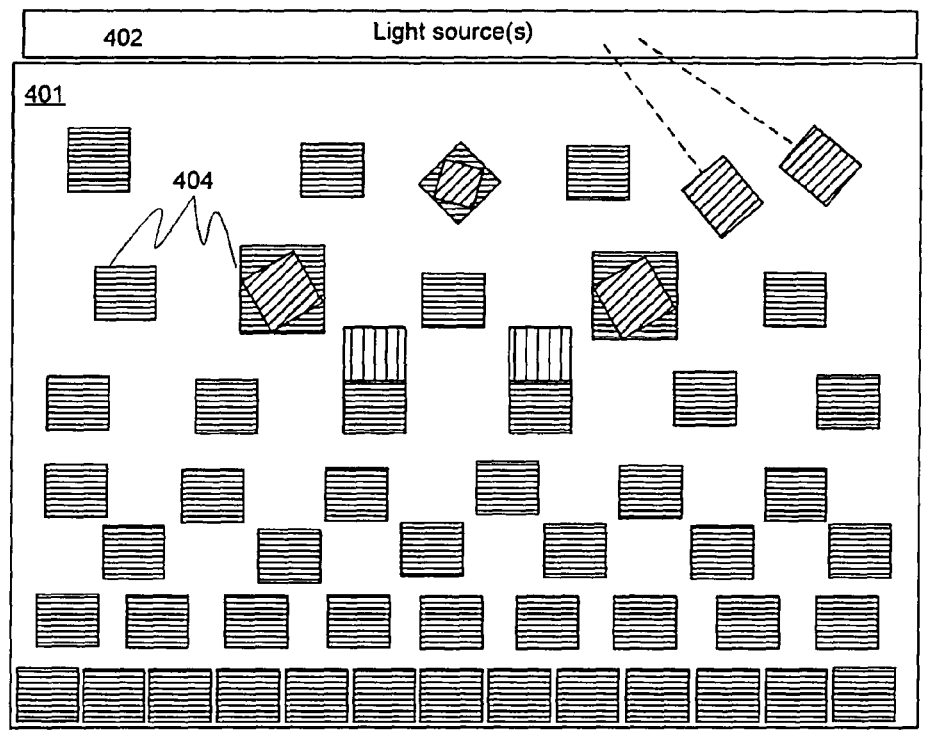

FIG. 4a illustrates, by way of example only, one embodiment of a lightguide arrangement wherein a plurality of different outcoupling units 404 are structured on the transparent lightguide surface area 401 and one or more light sources such as fluorescence lamps or LEDs, 402 are located adjacent to one end of the guide. The lines within the units 404 in this particular embodiment represent diffractive surface relief forms, such as grating grooves (or their "peaks"). The outcoupling units 402 may differ in size, shape, alignment, internal structures, materials, etc. Also, aggregate units including different kinds of sub-structures, such as linear, curved or wavy forms, can be utilized to efficiently direct light incident thereon. The distance between the adjacent outcoupling units may be varied based on a predetermined schema. For instance, as the intensity of light tends to drop when moving farther away from the light sources 402, the density of outcoupling units can be respectively increased lengthwise and/or widthwise as a function of distance to the light source and/or light incoupling means to compensate the loss.

The outcoupling units 404 may be independently or groupwise aligned towards predetermined light source(s); notice e.g. the two units 404 on top right that are rotated so that the peak lines of the grooves reside substantially perpendicular to a particular point light source (fictitious rays from the source depicted as broken two lines) from a plurality of light sources included in the entity marked with 402.

The material of the lightguide may be plastic, e.g. polymer, class, or silicon, for example.

Figure 4B:
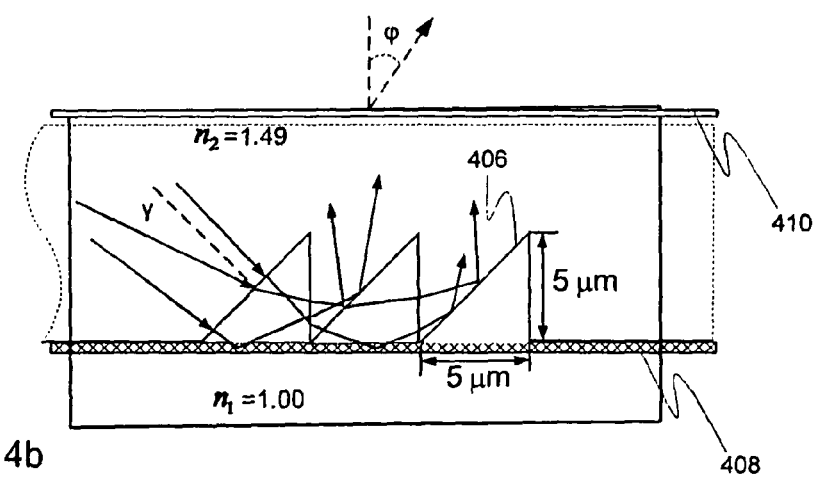

FIG. 4b discloses a cross-section of one embodiment of an outcoupling unit (inside a rectangle) in accordance with the present invention. Such diffractive light outcoupling unit may be generally the to form a part of a light outcoupling system of a lighting arrangement including a plurality of diffractive outcoupling units, and to include a substantially transparent carrier element for transporting light and a diffractive structure including a plurality of consecutive diffractive surface relief forms defined on a surface area of the carrier element, wherein the forms have substantially blazed or slanted groove profiles and the profile period is about 15 microns or less, and typically between about 0 and about 10 microns, and most typically between about 0 and about 5 microns, according to one particular embodiment it is about 3 microns, arranged to couple light incident on the diffractive structure via one or more relief forms belonging to the plurality of relief forms towards a predetermined direction and/or exit area on the carrier element so that at least some of the light rays incident on one of the plurality of grating grooves within a predetermined incident angle and a predetermined conical angle are at least partly coupled towards the desired direction and/or exit area via interaction involving the one and at least one another relief form of the plurality of relief forms. Some of the rays that are properly coupled may co-operate with each of the relief forms of the grating structure, i.e. the surface relief pattern of the outcoupling unit.

Still referring to FIG. 4b, in this particular embodiment there are blazed grooves 406 as surface relief forms of a diffractive surface relief pattern defined on the carrier element bottom surface that is optionally covered with a reflector 408; for example, a specular reflector can be provided by a surface relief pattern, such as a grating, being arranged to provide a predetermined type of reflectivity and support the grooves of the surface relief pattern 406 in the overall illumination task so that the desired lighting effect is obtained.

The grooves of the surface relief pattern 406 have a period and height of 5 microns in this embodiment, but in other embodiments different periods and/or dimensions can be utilized, e.g. period and/or height of 1, 2, 3, 4, or 10 microns. The carrier element of the embodiment has refractive index of 1.49 that compares with the one of synthetic polymer PMMA (acrylic, transparent plastic) whereas the surrounding medium corresponds to e.g. vacuum, or in practical conditions most often air, with refractive index of about 1.0. The incident angle in relation to the grating normal is marked with $\gamma$. The desired outcoupling direction is a predetermined direction that may vary among embodiments. The outcoupling direction could, in this example, be the direction of the normal of the lightguide's top surface, i.e. the outcoupling angle would be defined relative to the normal of the outcoupling top surface, i.e. the desired exit surface. The outcoupling angle is marked with $\phi$ in the figure. Also, other alternatives for defining the outcouple angle may be utilized; the angle can be defined on the basis of a selected grating surface, for example.

All illustrated rays at least partly penetrate the first grating groove and reflect and scatter from the second or third one towards the top surface of the carrier element. Some of the visualized rays may have exited the carrier element through the bottom surface without the optional reflector 408. At least part of the bottom surface can be treated so as to widen the incidence angle $\gamma$ within which the incident light will still exit the predetermined, desired exit surface and/or direction, typically also within a predetermined, desired exit angle, e.g. $+/-\phi$. The exit surface, i.e. the top surface in this particular embodiment, may include diffractive elements, typically in a form of a relief structure 410, e.g. a diffuser (round/elliptical vs. angular correlation) including e.g. binary, sinusoidal or rotated ("lateral") blazing to fine-tune the scattering of the outcoupled light. The diffuser may be used to controllably scatter light that may be, due to the improved efficiency of the primary surface relief pattern of the outcoupling unit, even too collimated for the particular application, for example. Thus, the various diffractive surface structures (typically relief patterns but also additional films, sheets, lamination, etc is possible) may be cleverly utilized on application basis to fine-tune the possibly more fixed outcoupling angle provided by the underlying relief pattern of the outcoupling unit.

Generally, the outcoupling angle (range) $\phi$ of light can be adjusted by selecting the blaze angle(s), form profiles (e.g. blazed, slanted, height, period) and alignment (horizontal and/or vertical, e.g. tilt in relation to the carrier surface) of the outcoupling units, by introducing additional surface structures or layers (top surface and bottom surface functional elements such as (specular) reflectors, diffusers, etc), and depositing the units itself on the carrier element substrate according to a predetermined set-up. Diffractive elements introduce orders to the outcoupled light in addition to mere reflected/scattered or transported/refracted rays, and by carefully selecting the used configuration, such as surface relief periods, forms, alignment, etc., the outcoupled light can still be controlled so as to maintain at least a predetermined, sufficient portion of outcoupled light within a predetermined target angle φ according to a selected efficiency criterion.

Figure 4C:
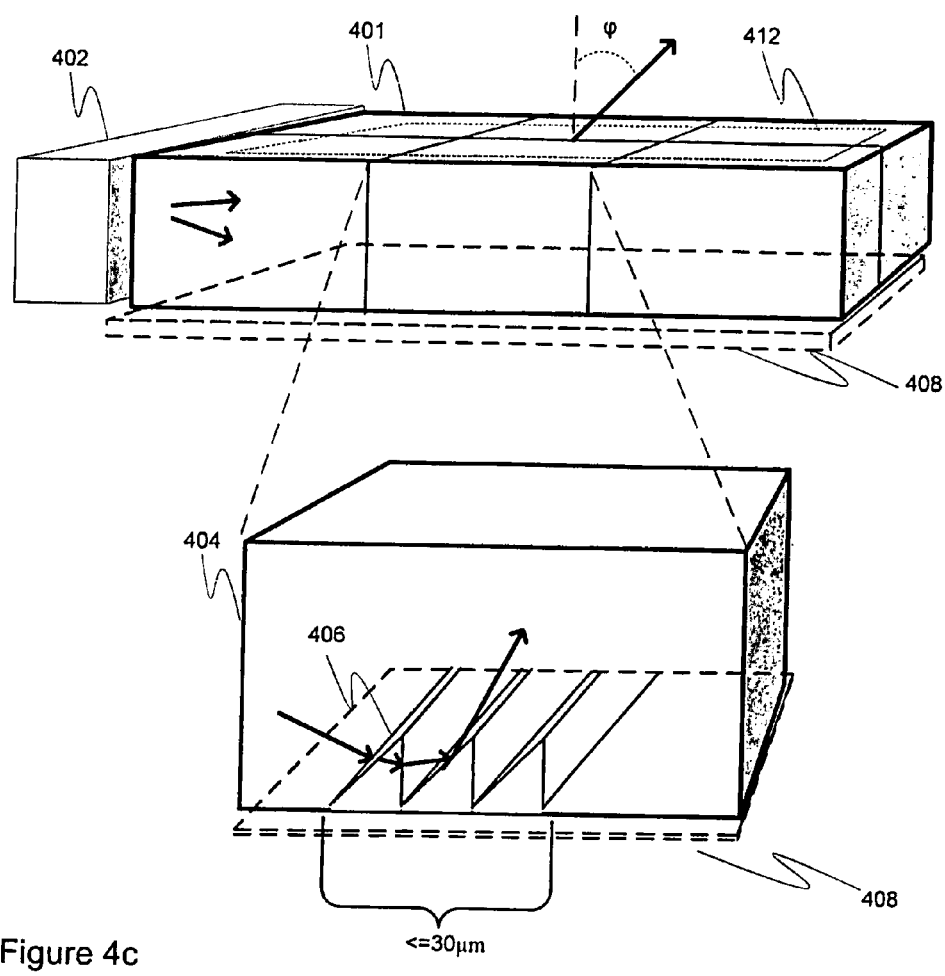

FIG. 4c discloses a three-dimensional visualization of the outcoupling unit 404 of FIG. 4b as a part of an outcoupling system according to an embodiment of the invention. In this particular example, the units 404 are illustrated as cubes that substantially extend from the carrier element, e.g. lightguide, 401 bottom to the top, but also other configurations and outcoupling unit forms can be used. One or more similar or different outcoupling units 404 may be capitalized in the overall outcoupling system to control the coupling of incident light towards the desired direction and/or desired exit surface area on the carrier element. Despite of the shape and size of used units 404, they can be considered as three-dimensional entities as the related surface relief forms such as the grating grooves indeed have width, length and height.

The light source 402 may be configured to radiate light (arrows) to be transported by the lightguide 401, wherefrom the outcoupling is performed by a number of outcoupling units 404, through the exit area illustrated as a dotted rectangle 412 on the top surface of the lightguide 401. In another embodiment, one predetermined surface of the lightguide 401, such as the top surface, may form the exit area as such. In a further embodiment, the exit area may be constructed from at least portions of several surfaces of the lightguide 401. Yet in a further embodiment there is a plurality of desired exit areas on the carrier element.

The same applies to outcoupling occurring from each outcoupling unit 404, i.e. depending on the location and shape of the particular outcoupling unit 404 in the outcoupling system in relation to the aggregate exit area of the system, the exit area of the unit 404 typically includes at least portion of one or more surface areas of the unit 404. The design and positioning of the diffractive structure(s) of the unit 404 may be selected so as to couple at least a predetermined portion of light incident within a predetermined incidence angle range to exit a desired surface of the unit within a predetermined exit angle, i.e. in a desired direction within predetermined efficiency parameter. It is appreciated by persons skilled in the art that in the context of this text the exit area is expressly the desired exit area, although in practical conditions some leakage through other areas typically exists as well.

The relief structure 410 such as a diffuser may be still present on the top surface but is omitted from the figure for clarity reasons. Various additional top/bottom/side surface elements such as the reflector 408 may be provided on the lightguide to cover at least part of the desired surface.

The illustrated unit 404 includes, as a surface relief pattern, a plurality of consecutive, blazed microprism-type grooves 406 on the bottom surface of the carrier element, i.e. the lightguide 401. Further, the unit 404 may also include one or more additional diffractive elements, such as a grating, e.g. multiple binary grooves, which reside after or before the grooves 406 on the vacant areas of the surface and are aligned either parallel or perpendicular in respect of the grooves 406.

Figure 4D:
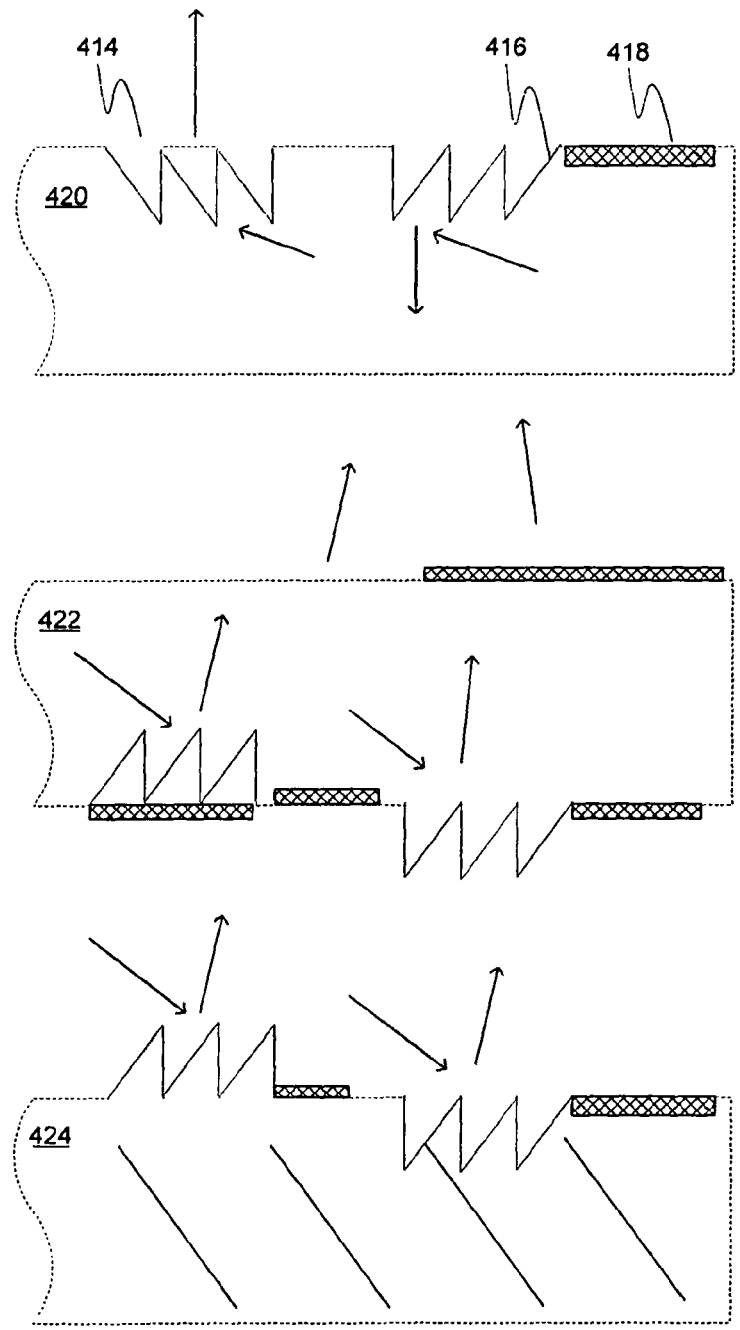

FIG. 4d discloses schematically examples of various embodiments of surface relief patterns and carrier element in accordance with the invention. In FIG. 4d, the diffractive surface relief forms and incident/outcoupled light have been presented for illustrative purposes only and the utilized angles or other dimensions shall not be generally considered as particularly advantageous designs. In cross-sectional view 420 the carrier element includes transparent material so that light can proceed forward within the medium and be outcoupled via surface relief patterns 414, 416 that are protrusions (414) and/or recesses/grooves (416) defined on the surface of the medium.

View 422 depicts an embodiment wherein the surface relief patterns 414, 416 are defined as protrusions and/or recesses on the predetermined surface area of the transparent, light transporting carrier element separate, e.g. opposite, to the desired exit area of the carrier element.

View 424 discloses an embodiment wherein the carrier element is not configured to transfer light itself, but merely acts a carrier for the surface relief patterns that are protrusions and/or recesses/grooves, for example.

Similar placement options apply to additional diffractive elements 418, e.g. reflectors and diffusers, which may be implemented as surface relief patterns, such as protrusions or recesses/grooves, on the carrier element, or alternatively or additionally provided as sheets, layers, or films on top of the desired surface of the carrier element. Such elements 418 may be provided on top or next to the surface relief patterns 414, 416. One skilled in the art will realize that although various examples of the possible locations of diffractive element 418 are disclosed in the figures, the depicted placements and element thicknesses have been mainly selected from an illustrative standpoint.

In one embodiment of the present invention the diffractive outcoupling unit may include two surface areas located on opposite sides of the carrier element, wherein both two areas include a diffractive surface relief pattern to co-operatively couple light outside the carrier element.

Figure 5A:
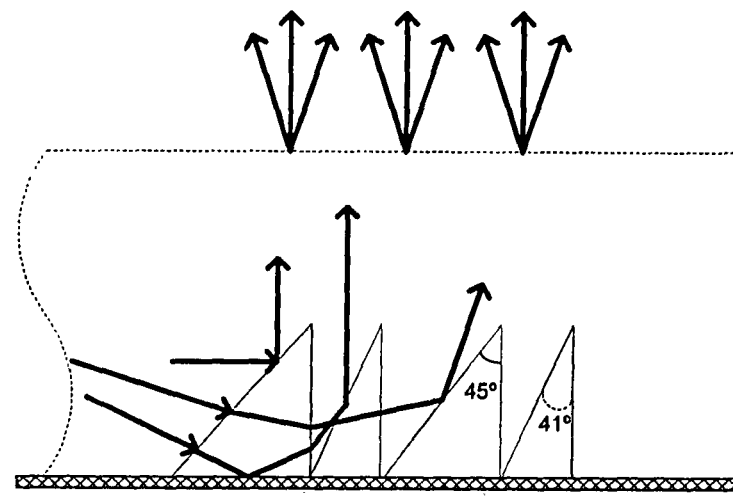

FIG. 5a illustrates a cross-section of an embodiment of a grating groove configuration within a diffractive outcoupling unit. The diffractive structure of the embodiment includes four blazed grooves defining profiles with variable blaze angle, the first and third ones with respect to the incident light having a blaze angle of about 45° whereas the second and fourth grooves have a smaller blaze angle of about 41°. Blaze angles can be varied to provide desired diffraction efficiency for the predetermined wavelength or to adjust the outcoupling angle relative to the incident angle in a typical way, for example.

Figure 5B:
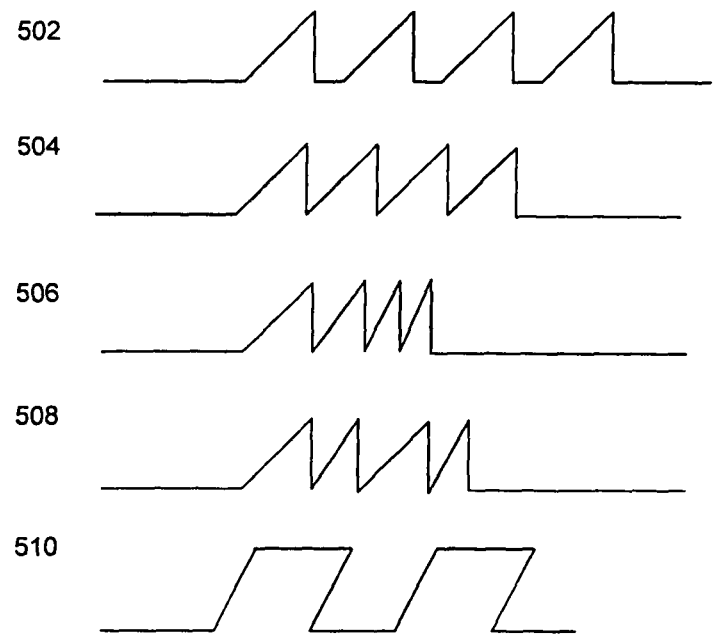

FIG. 5b illustrates further exemplary embodiments of surface relief patterns. In embodiment 502 a number of surface relief forms, such as grooves, with similar blaze angle are separated by a small groove-free area. In another embodiment the blaze angles could be varied between individual grooves. Embodiment 504 includes four identical grooves are simply located consecutively to each other with a desired blaze angle. In embodiment 506 the blaze angle between consecutive grooves is gradually altered. In embodiment 508 the blaze angle is varied groove-wise. In embodiment 510 the grooves are slanted rectangles, i.e. slanted binary grooves. The patterns of FIG. 5b may be implemented as protrusions extending from the carrier element surface or as recesses therein, for example.

In different embodiments of the outcoupling unit of the present invention one or more consecutive forms of a surface relief pattern may be located substantially right after each other, see, for example embodiment 504, or separated so that the distance between the forms is kept short enough, i.e. the form period is within a predetermined limit in order to implement the interactivity feature of the invention with sufficient efficiency. Via cross-sectional inspection of the latter embodiment, see, for example, embodiment 502, the profiles of the forms do not directly connect with each other but there is a small physical separation between them. The form period is still typically about 15 microns or less, more typically about ten microns or less, and most typically about five microns or less.

Figure 6A:
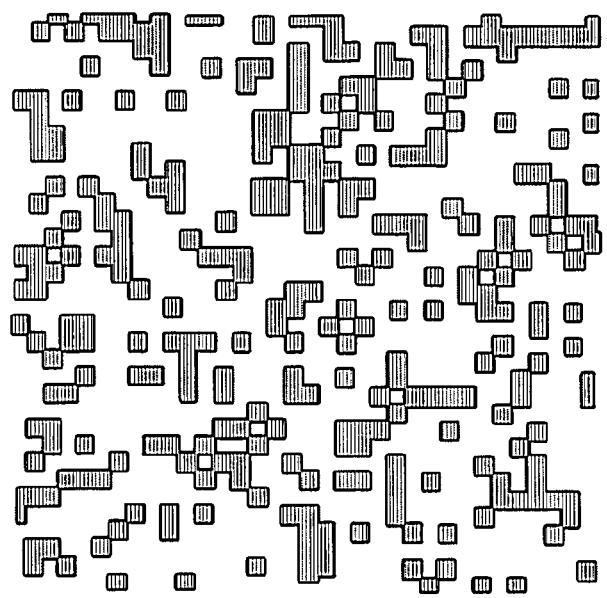
FIG. 6e is another planar view acquired with a microscope of a diffraction structure of an outcoupling unit according to an embodiment of the invention on a carrier element surface.

FIG. 6a illustrates an embodiment of an outcoupling system wherein a plurality of outcoupling units has been organized in a semi-randomized manner on the substrate acting as the carrier element. In semi-randomization outcoupling of light from the carrier element may still be analytically considered but additional care has been taken not to place the units fully aligned with each other to form a regular grid. In one embodiment a predetermined surface area of the substrate is divided into a number of local modeling areas, whereby each local modeling area shall still fulfill a number of conditions, such as maximum distance between outcoupling units or predetermined density of outcoupling units within the area, etc. The outcoupling units, represented by little squares in the figure located either alone or formed into groups of various shapes, may be rotated and/or tilted in relation to each other and light source(s). Such semi-randomization can be utilized in avoiding the Moiré effect or to align the outcoupling units in respect of different light sources, for example.

Figure 6B:
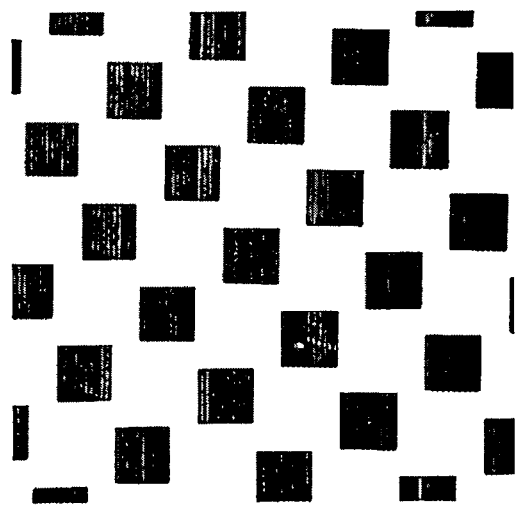

FIG. 6b illustrates an embodiment of a relatively dense, regular pattern formed by a plurality of diffractive structures, e.g. diffractive surface relief patterns of outcoupling units, on a substrate.

Figure 6C:
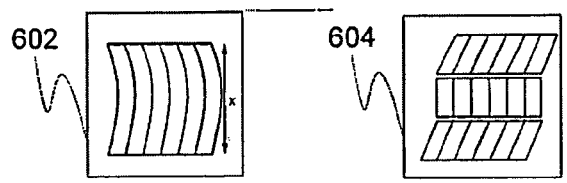

FIG. 6c illustrates two more exemplary diffractive structures that can be utilized in outcoupling units. Reference numeral 602 is an outcoupling unit that includes six curved lines, whereas the aggregate structure at 604 includes grooves that are piecewise linear in three differently aligned groups with some predetermined physical separation.

Figure 6D:
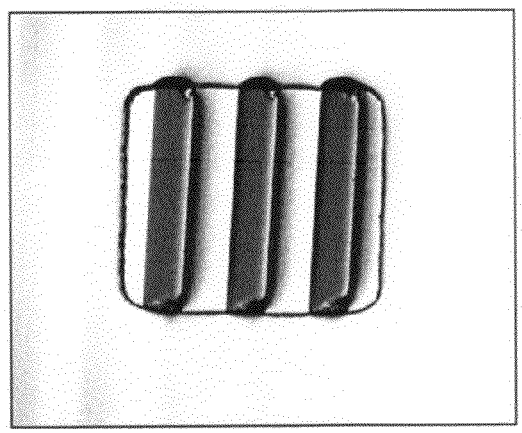

FIG. 6d illustrates a view acquired with a microscope of an embodiment of a diffractive surface relief pattern with three parallel, consecutive grooves.

Figure 6E:
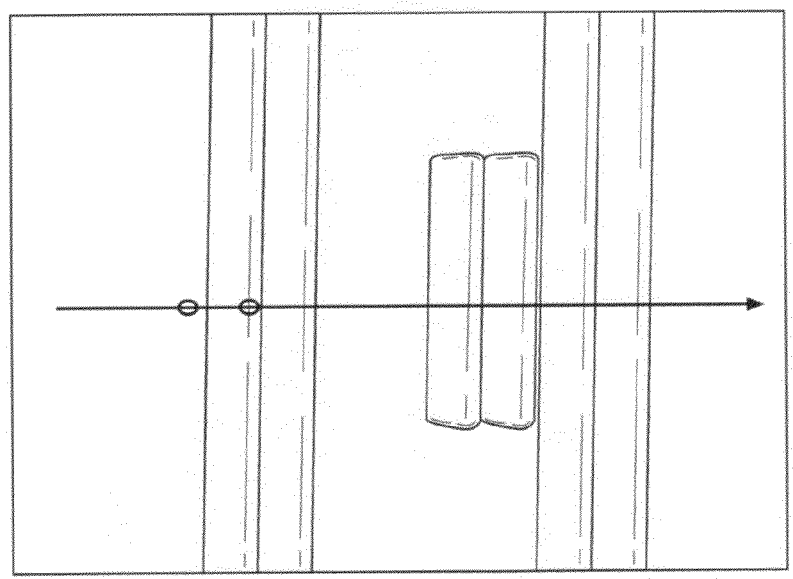
Figure 6E:
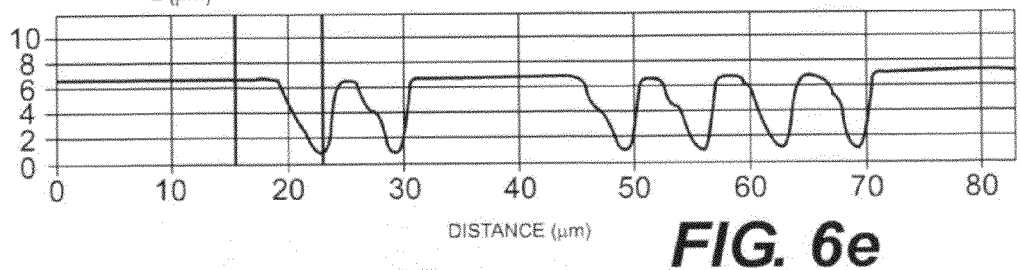

FIG. 6e illustrates a view acquired with a confocal microscope of an embodiment of a diffractive structure that includes a diffractive surface relief pattern incorporating two and four parallel grooves having different lengths. Profile measurement represents the groove period and height.

Figure 7A:
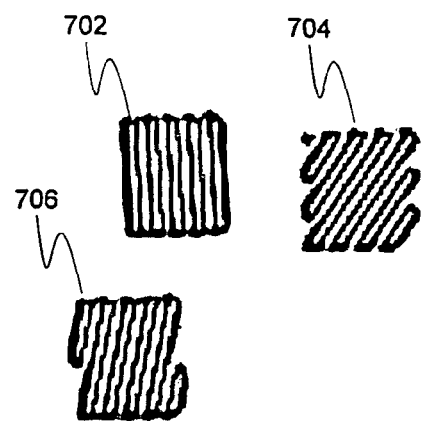
FIG. 7a illustrates further embodiments of outcoupling unit arrangements.

FIG. 7a is a further microscope view of three embodiments of diffractive structures 702, 704, 706 on a substrate having a square outline and same size. Between and/or within the units the grooves differ in alignment and length.

Figure 7B:
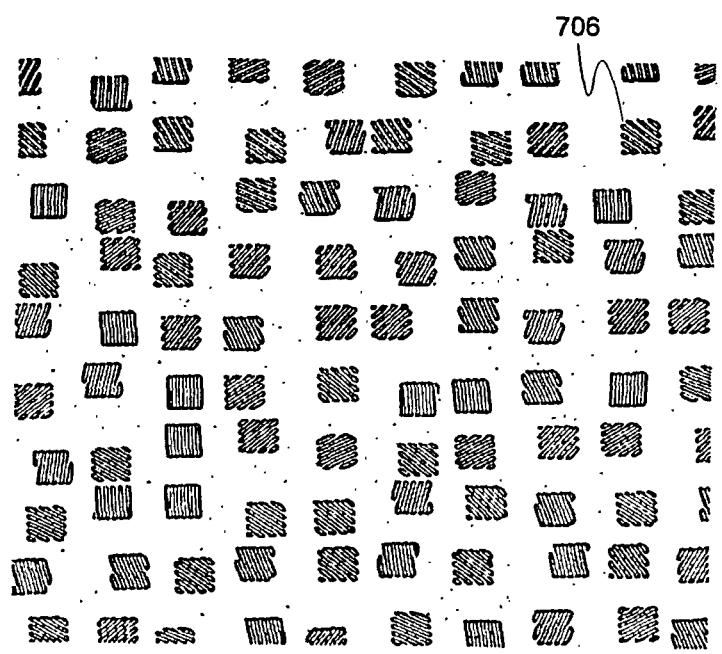
FIG. 7b illustrates further embodiments of outcoupling unit arrangements.

FIG. 7b is a microscope view of plurality embodiments of diffractive structures on a substrate having varying square outlines.

Figure 8:
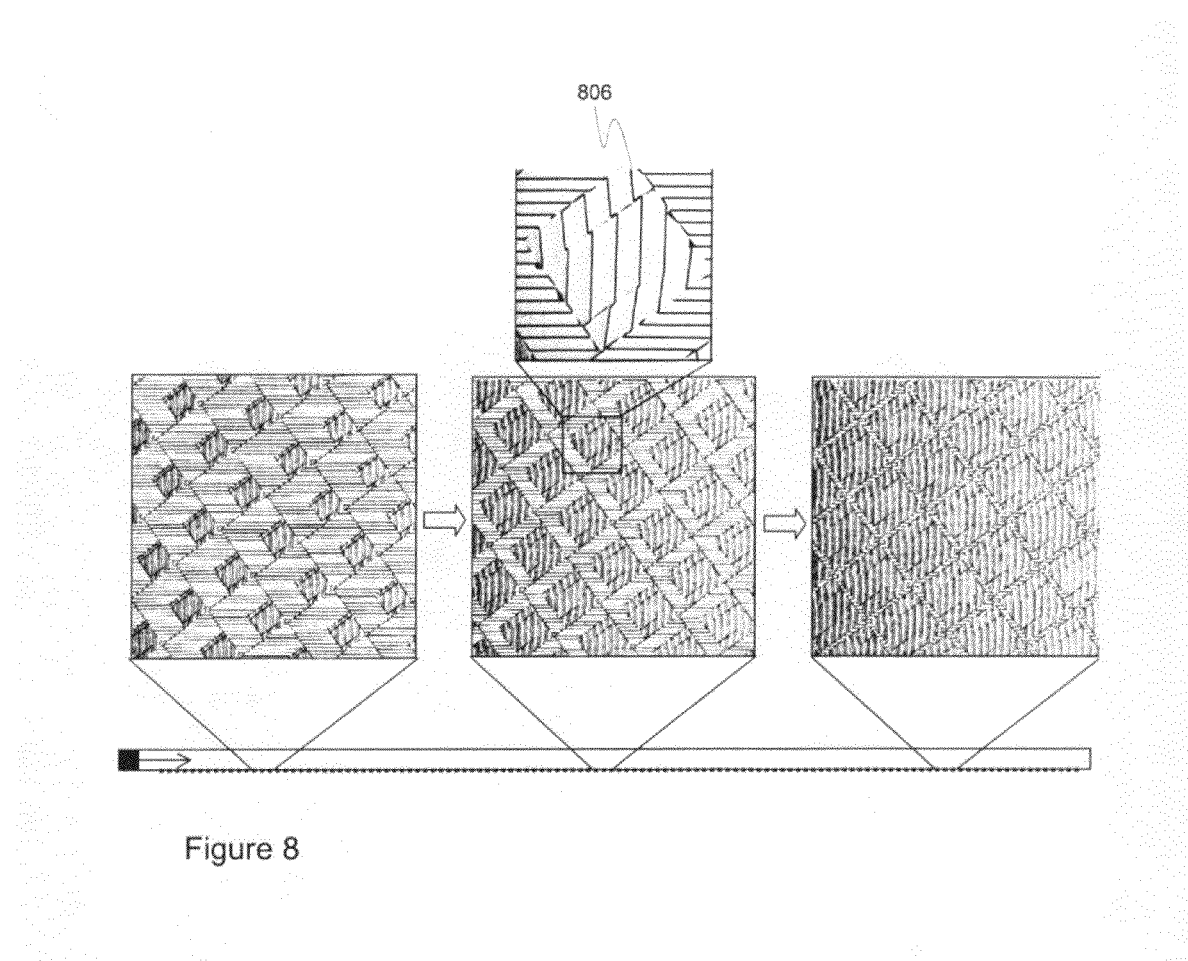
FIG. 8 illustrates one example of aggregate outcoupling units on the entire lightguide.

FIG. 8 illustrates an embodiment of three portions of diffractive surface relief structures of a modulated lightguide pattern including different entities that can be considered as aggregate outcoupling units and/or supporting structures including adjacent and nested structures. Larger square entities include optionally differently aligned smaller squares 806 (highlighted with a dotted line and enlargened) further including divergent relief forms, such as divergent grooves dividing the smaller squares into three separable sub-areas. In another embodiment, the grooves are parallel but discontinuous, i.e. there's a shift in the grooves dividing the smaller squares 806 into further sub-areas. The sub-areas can be considered as outcoupling units of their own with elongated rectangle shape, or as different parts of a single outcoupling unit. Angular shifting of relief forms can be utilized in avoiding the Moiré effect in combination with a lightguide and a display. The resulting overall structure may thus be cleverly scalable. Some of the areas encompassing diffractive forms may be configured to work as primary outcoupling components whereas the other areas are configured to fine-tune or adjust the outcoupling angle mainly set by the primary outcoupling components. For example, the smaller squares 806 can be arranged as primary outcoupling units whereas the surrounding parts of larger squares include supporting elements, e.g. partial scattering. Exemplary groove combinations in aggregate structures include: blazed+binary grooves, blazed+(90° or x°)-rotated grooves, blazed grooves+top/bottom diffuser entity, etc. Instead of grooves also corresponding protrusion forms are applicable or even preferred depending on the embodiment.

Hereinafter, a few exemplary scenarios are described to facilitate design of desired diffractive outcoupling unit and system set-ups according to embodiments of the present invention.

Figure 9A:
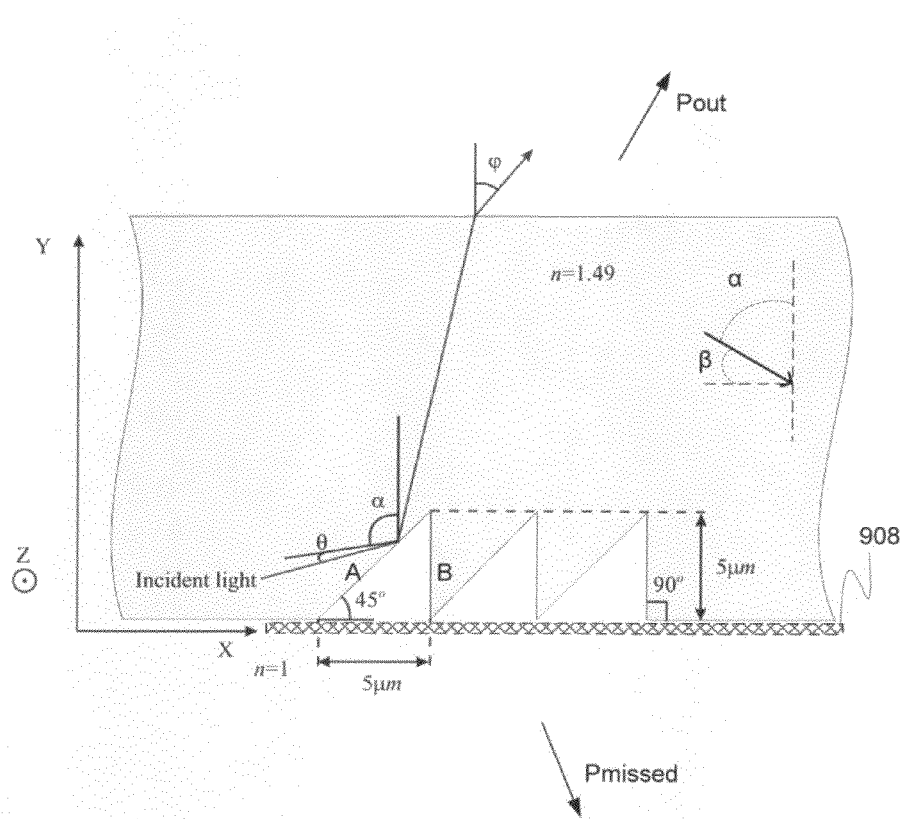
FIG. 9a illustrates an embodiment with three diffractive surface relief forms in a surface relief pattern.

FIG. 9a discloses an embodiment wherein light falls on three microprism-type blazed grating grooves at angle $\alpha$ in the XY-plane, and at angle $\theta$ in the YZ-plane. Reference numeral 908 indicates an optional reflector, e.g. a mirror. The 5×5 micron grating grooves are located close to each other. The lightguide refractive index is e.g. n=1.49. Let us first consider a situation where no reflector 908 is present. Also, an assumption that no light rays exist in the lightguide with angles $-45°<\alpha<42°$ is made. A distinctive feature of a sequential prism triplet is that rays incident on the first groove at angles $42°<\alpha<87°$ will almost entirely pass through surface A. Note that some portion of light coming to the bottom of side A will be lost after going out from the waveguide into the space, whereas the remaining light that falls onto side B is reentered into the waveguide. However, after re-entering the waveguide through side B, the angle $\alpha$ will be increased. After passing one or two grooves, as a result of the increasing angle, the ray may find itself in incident angle range $87°<\alpha<132°$ and be output from the waveguide with the third groove. Below is an estimation of the performance of the arrangement by considering the relationship between the power that is output from the waveguide's top surface, i.e. the desired exit area, and the power that is lost from the bottom surface without a reflector. Table 1 gives estimated values of the lost energy $P_{missed}$, for different incidence angles $\alpha$ as well as the ratio $P_{out}/P_{missed}$ of useful output energy to the energy lost at the grooves. Data is for non-polarized light.

TABLE 1

Output of energy for different angles $\alpha$, at $\theta = 0°$.

| | $\alpha$, ° | | | | | |
|---|---|---|---|---|---|---|
| | 45 | 50 | 60 | 70 | 80 | 90 |
| $P_{missed}$, % | ~45 | ~30 | ~13 | ~3.8 | 0 | 0 |
| $\frac{P_{out}}{P_{missed}}$ | 0.05 | 0.16 | 2.9 | 9 | ∞ | ∞ |

When $P_{out}/P_{missed}=\infty$, the entire energy is output from the waveguide's top. When $P_{out}/P_{missed} \to 0$, most of the energy is output from waveguide's bottom and lost. It can be seen from Table 1 that the smaller the angle $\alpha$, the bigger the losses and the smaller the useful output.

Table 2 gives data on the energy output for different angles θ.

TABLE 2

Output of energy from the waveguide for different angles α, at θ ≠ 0°.

| α, ° | 45 | 60 | 80 |
|---|---|---|---|
| θ = 10° | | | |
| $\frac{P_{out}}{P_{missed}}$ | 0.047 | 3.1 | ∞ |
| θ = 20° | | | |
| $\frac{P_{out}}{P_{missed}}$ | 2 | 3.15 | ∞ |
| θ = 30° | | | |
| $\frac{P_{out}}{P_{missed}}$ | 0.042 | 2.21 | ∞ |

Although they may not apply in all situations, some general conclusions may be drawn from the above. For example, the larger the angle θ, the larger the angle φ is at the waveguide's output. The larger the ratio $P_{out}/P_{missed}$, the larger the proportion of useful output energy may be. When the ratio is 1, same quantity of energy may be output from the waveguide's top and bottom. Experiments have shown that the above ratio typically increases together with angle α.

Next, a corresponding scenario incorporating the reflector 908 is analyzed, but the number of prism-type grooves is varied between 1 and 5 to obtain comprehensive comparison data. Angle β describes the deviation of the particular light ray from the angle α=90°, i.e. from the horizontal direction. Because the waveguide's refractive index is n=1.49 (e.g. PMMA), the rays found in the range 42°<α<90° (0°<β<48° inversely) will propagate in the waveguide under the condition of total internal reflection. The negative angles −48°<β<0° (90°<α<138°) will be considered with the positive ones, because due to reflection from the top and bottom waveguide's surfaces the angles +β and −β exist simultaneously. Thus, the range of angles considered is 0°<|β|<48'. It shall be appreciated by those skilled in the art that the incident light in the range −45°<β<−42° falls onto the first side of the groove and may be reflected from it. Hence, this range of angles will not add to the light energy output at useful angles even if the number of blazed grating grooves is increased.

Figure 9B:
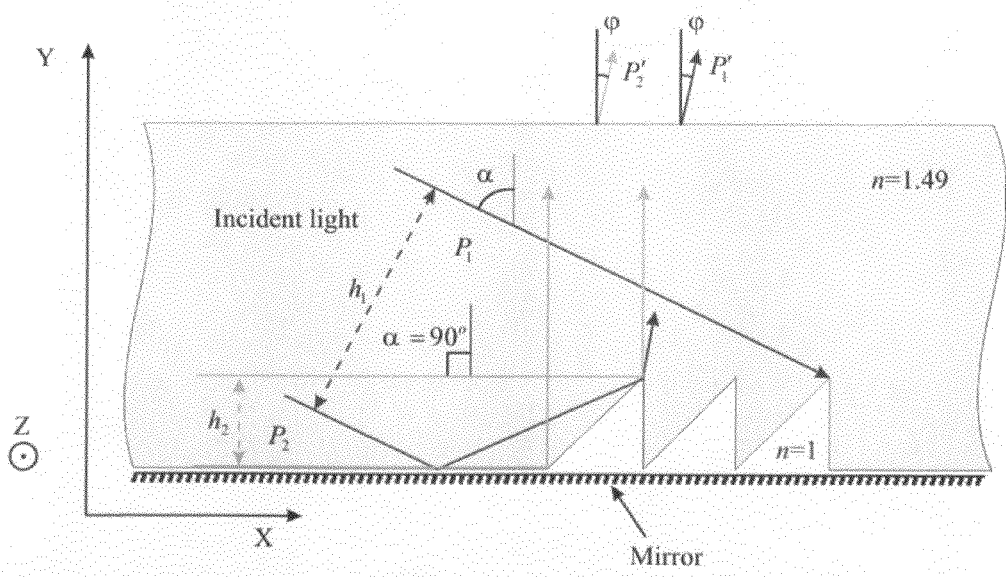
FIG. 9b illustrates one possible arrangement for outcoupling efficiency determination.

The efficiency of light directing at a given angle φ can be estimated in a number of ways. FIG. 9b illustrates one exemplary embodiment.

Let the radiation power P fall onto the groove. Then, the efficiency can be defined as ηi=P'/P, where P' is the radiation output by the grooves, satisfying one possible condition imposed on the light output angle: 0<|φ|<20°. If α=90°, all incident light will be, in theory, output from the waveguide, that is $\eta=P_2'/P_2=100\%$. When the angle of incidence α is other than 90°, the output efficiency is less: $\eta=P_1'/P_1<100\%$. Thus based on the above estimation, it can be assumed that in this case the grooves show worse performance. However, the absolute value of the output power may be not less than $P_2'$, since considering the uniform density of the incident beam (the ratio of the power to beam's cross-section), $P_1>P_2$ as $h_1>h_2$ ($P_1/h_1=P_2/h_2$).

Hence, it may be concluded that the above estimate of the efficiency may be insufficient because the incident power on the grating grooves is different at different angles α (or β).

Due to this, assuming a uniform density of incident light onto the grooves (P/h=const) at all angles α, we introduce a different estimate of the diffractive element-aided light output efficiency:

$$\chi_m = \frac{P_m}{\max\{P_\alpha\}},$$

where 42°<α<90°, $P_m$ is the power output from the waveguide in the direction 0<φ<20° with the current value of angle α, and max$\{P_\alpha\}$ is the maximum value of the output power for the angle α satisfying the condition 42°<α<90° for any number of blazed grating grooves.

Thus, the value χ represents a relative power of output light normalized to the maximal derived output power for various number of grating grooves and incidence angles, being equal to χ=100 (in relative units) for the only combination of the incidence angle parameters and the number of grating grooves.

Tables 3-7 present the incidence angles α and β with a step of 5° and the corresponding angles φ of light output from the waveguide for 1-5 blazed grating grooves. Useful output angles are bolded: 0<|φ|<20°. The values of the efficiency η (percentage) and χ (in relative units) have the physical meaning as specified above. The negative angles φ in tables 3-7 indicate that the rays proceed towards the semiplane −XY (to the left of FIG. 9a), the positive angles—for the semiplane XY. In Tables 4-7, new light output angles φ are shown on a darkened background; if these new angles φ are found in the useful range, in this example 0<|φ|<20°, the corresponding values of η and χ are also shown with the darkened background. In the columns α and β values for which η>50% are printed on the darkened background.

The last line in all the tables shows the estimated performances of the blazed grating grooves at all angles. The value of η in the last line presents an average efficiency of light output when uniform light falls onto the grooves simultaneously from all above-considered incidence angles. The value of χ in the last line of all the tables is proportional to the energy output in the useful direction for every number of grating grooves, with the radiation output by five grooves taken to correspond to 100%.

TABLE 3

The angles φ and light output efficiency vs the angle α (β), for an individual groove.

| α, ° | β, ° | φ, ° | η, % | χ |
|---|---|---|---|---|
| 90 | 0 | 0 | 96 | 56.6 |
| 85 | 5 | −7.3, 7.4 | 55.9 | 66 |
| 80 | 10 | −14.6, 14.3 | 43.9 | 50.8 |
| 75 | 15 | −22.7, 22.3 | 0 | 0 |
| 70 | 20 | 30.3 | 0 | 0 |
| 65 | 25 | 39.4 | 0 | 0 |
| 60 | 30 | 48.6 | 0 | 0 |
| 55 | 35 | 59.2 | 0 | 0 |
| 50 | 40 | 73.5 | 0 | 0 |
| 45 | 45 | — | 0 | 0 |
| All | All | All | 19.58 | 22.9% |

TABLE 4

The angles φ and light output efficiency vs the angle α (β), for two grooves.

| α, ° | β, ° | φ, ° | η, % | χ |
|---|---|---|---|---|
| 90 | 0 | 0 | 96 | 56.6 |
| 85 | 5 | −7.3, 7.4, 28.8 | 54.6 | 67 |
| 80 | 10 | −14.6, 13.8, 14.3 | 76.6 | 97.6 |
| 75 | 15 | −22.3, 3.4, 22.5 | 46 | 59.7 |
| 70 | 20 | −5.5, 5, 30.3 | 20.7 | 27.4 |
| 65 | 25 | −14.4, 14.2, 39.4 | 14.6 | 19.4 |
| 60 | 30 | 22.3, 48.6 | 0 | 0 |
| 55 | 35 | 30.5, 59.2 | 0 | 0 |
| 50 | 40 | 36.7, 73.5 | 0 | 0 |
| 45 | 45 | 45 | 0 | 0 |
| All | All | All | 30.85 | 43.3% |

TABLE 5

The angles φ and light output efficiency vs the angle α (β), for three grooves.

| α, ° | β, ° | φ, ° | η, % | χ |
|---|---|---|---|---|
| 90 | 0 | 0 | 96 | 56.6 |
| 85 | 5 | −7.3, 7.4, 28.8 | 53.4 | 68 |
| 80 | 10 | −14.6, 13.8, 14.3 | 71.9 | 98.4 |
| 75 | 15 | −22.3, 3.4, 22.5 | 49 | 71.1 |
| 70 | 20 | −5.5, 5, 30.3 | 22.2 | 33.6 |
| 65 | 25 | −14.4, 14.2, 15.2, 39.4 | 40.7 | 63.4 |
| 60 | 30 | 4, 22.3, 48.6 | 28.4 | 45.6 |
| 55 | 35 | −5.1, 4.7, 30.5, 59.2 | 14.1 | 23.2 |
| 50 | 40 | −12.8, 12.4, 36.7, 73.5 | 7.6 | 12.5 |
| 45 | 45 | −19.8, 19.4, 45 | 8.7 | 14.6 |
| All | All | All | 38.33 | 64.2% |

TABLE 6

The angles φ and light output efficiency vs the angle α (β), for four grooves.

| α, ° | β, ° | φ, ° | η, % | χ |
|---|---|---|---|---|
| 90 | 0 | 0 | 96 | 56.6 |
| 85 | 5 | −7.3, 7.4, 28.8 | 52 | 69.3 |
| 80 | 10 | −14.6, 13.8, 14.3 | 67.8 | 99.2 |
| 75 | 15 | −22.3, 3.4, 22.5 | 50.7 | 81.4 |
| 70 | 20 | −5.5, 5, 30.3 | 23.3 | 39.9 |
| 65 | 25 | −14.4, 14.2, 15.2, 39.4 | 43.5 | 79 |
| 60 | 30 | 4, 22.3, 48.6 | 36.5 | 69.3 |
| 55 | 35 | −5.1, 4.7, 30.5, 59.2 | 18.7 | 36.9 |
| 50 | 40 | −12.8, 12.4, 17.4, 36.7, 73.5 | 21.1 | 43.1 |
| 45 | 45 | −19.8, 7.6, 19.4, 45 | 22.6 | 47.3 |
| All | All | All | 43.22 | 82% |

TABLE 7

The angles φ and light output efficiency vs the angle α (β), for five grooves.

| α, ° | β, ° | φ, ° | η, % | χ |
|---|---|---|---|---|
| 90 | 0 | 0 | 96 | 56.6 |
| 85 | 5 | −7.3, 7.4, 28.8 | 50.7 | 70.6 |
| 80 | 10 | −14.6, 13.8, 14.3 | 63.7 | 100 |
| 75 | 15 | −22.3, 3.4, 22.5 | 52.2 | 91.7 |
| 70 | 20 | −5.5, 5, 30.3 | 24.1 | 46.1 |
| 65 | 25 | −14.4, 14.2, 15.2, 39.4 | 45.9 | 94.8 |
| 60 | 30 | 4, 22.3, 48.6 | 42.4 | 93 |
| 55 | 35 | −5.1, 4.7, 30.5, 59.2 | 21.9 | 50.6 |
| 50 | 40 | −12.8, 12.4, 17.4, 36.7, 73.5 | 30.1 | 72.8 |
| 45 | 45 | −19.8, 7.6, 19.4, 45 | 32.3 | 80.9 |
| All | All | All | 45.93 | 100% |

In view of the tables, it appears as if adding new grating grooves can cause new light output angles φ to appear. It shall be noted that with any extra blazed groove a fewer number of new angles may appear, with the new angles found in the range of greater values of the incidence angle β (smaller values of the angle α). The average efficiency of light output η may increase together with the number of blazed grating grooves, and the greater is the number of grating grooves, the lower the increase rate may be. Correspondingly, in general, the greater is the number of the blazed grating grooves, the larger is the proportion of output energy in the useful direction. It may be inferred that typically two grooves may be able to output by 89% more energy than one groove, three grooves by 48% than two, four grooves by 28% than three, and five grooves by 22% than four. Note that the above conclusion typically holds at uniform incidence of light at all angles considered. It may also be concluded that when using 3, 4, and 5 grooves, the radiation will typically be output at all considered angles of incidence, whereas with 1 or 2 grooves, a big proportion of refracted light typically will continue to propagate in the waveguide.

Thus, in many applications that may require improved outcoupling directivity, e.g. outcoupling of a wider incidence angle range to a narrower output angle range, using only one blazed grating groove is not effective enough and adding few blazed grating grooves radically improves the efficiency without widening the output angle too much.

Figure 9C:
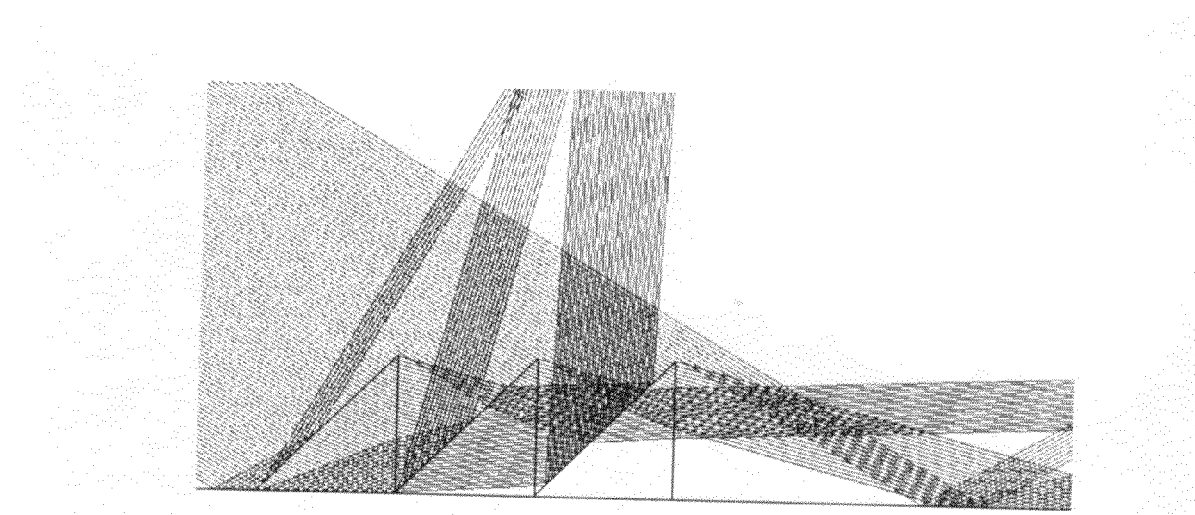
FIG. 9c illustrates the effect of outcoupling in the context of one embodiment according to the present invention.

FIG. 9c further visualizes an embodiment including three blazed grooves, a reflector and incident light at angle α=60°. Over 50% of rays may advantageously be outcoupled from the waveguide top surface at small angles relative to the waveguide's surface normal. Less than 50% of rays may continue to propagate within the waveguide. FIG. 9c shows how the reflector can prevent some rays from escaping the waveguide through the bottom thereof.

Figure 9D:
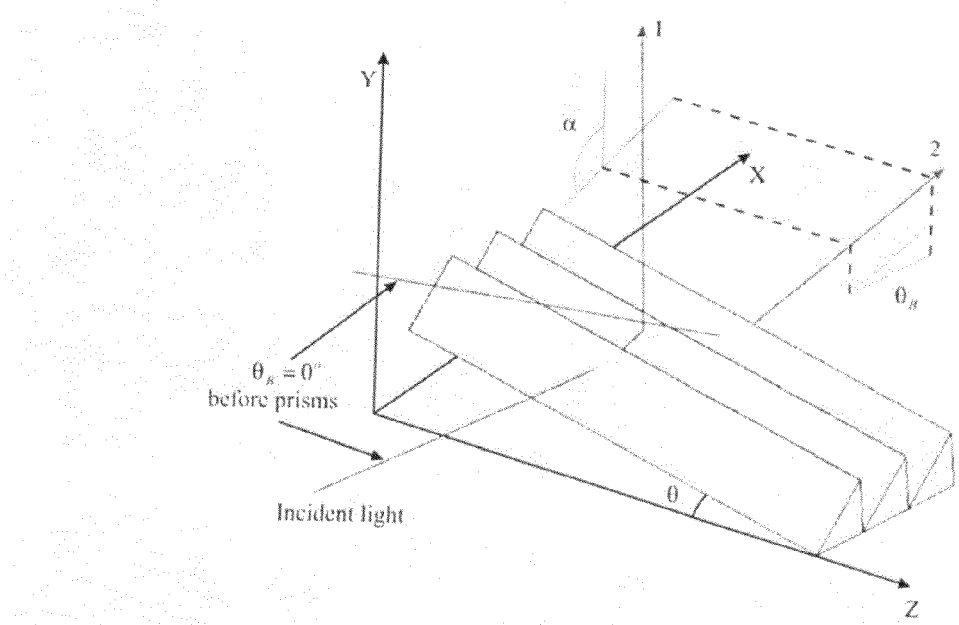
FIG. 9d illustrates an exemplary scenario wherein the effect of conical angle of incident light is analyzed.

FIG. 9d illustrates an embodiment wherein the angle θ is not zero. In this example, the conical angle θ determines the groove's deviation from the visualized YZ-plane. The light falls on the grating at angle θb=0. The output rays from the grooves will be rotated by the angle θb. Prior to striking the grooves, the incident rays are found at the XY-plane. On falling the surface of the first groove, the ray may either be reflected (backscattered) or refracted, reaching the other surface. Increment in the number of interactions with the grooves (via refraction or backscattering), increases the angle θb by which the output ray is rotated. Ray 1 experiences reflection from the tilted groove surface at an angle α close to 180°. If the ray strikes the grooves in such a way that it will not leave the waveguide after passing through one or two grooves, it may continue to propagate within the waveguide, with the angle θb being not zero (ray 2). In this case, the ray will arrive at the next parallel groove(-set) at a smaller angle of incidence: θ−θb, wherein 0<θb<θ).

Thus, provided a large number of sequential acts of interaction with different groove-sets, rotated by angle θ, the ray acquires the angle θb such that θb→∞ (θb will compensate for the angle θ as if θb=0° and θ=0° deg). This may take place only if the rays that continue to propagate in the waveguide will pass through the grooves. If a ray continues to propagate in the waveguide after being reflected from the groove surface, its deviation θb will be in the opposite direction. However, the percentage of such rays in the waveguide typically is relatively small.

Next, values of angle θ at which the output angle from the waveguide, i.e. angle φ, will satisfy the condition |φ|<15°, are investigated. Table 8 gives the output angle φ as a function of angle θ at α=90°.

TABLE 8

Angle φ vs angle θ, at α = 90 deg.

|  | θ, ° | | | | |
|---|---|---|---|---|---|
|  | 0 | 2.5 | 5 | 7 | 10 |
| φ, ° | 0 | 3.7 | 7.5 | 10.5 | 15 |

Table 8 shows that for a fixed angle of light incidence of α=90° all the angles in the range 0<θ<10 may provide reasonable outcoupling result (|φ|<15° deg). In the example under consideration, a single beam of rays was formed upon reflection from the grooves (namely, the first groove in the row). Decreasing the angle α at fixed angle θ increasing the output angle of rays, φ, followed, however, by the emergence of new groups of rays. On emerging a new group of rays, it turns out that a portion of light will once again leave the waveguide at an admissible angle.

Accordingly, in this example, when light is incident on the grooves at angle θ≠0° deg, the biggest proportion of light that continues to be propagated in the waveguide after interaction with the grooves, will be propagated at angle θb such that on falling onto the subsequent grooves, this angle will partially compensate for angle θ. The bigger is the number of the acts of interaction between the output rays and the prisms, the bigger is the angle θb but also the angle α will be closer to about 180 deg. Exemplary condition |φ|<15° is substantially satisfied when θ<10° for suitable angles α; refer to Table 8. However, in real-life scenario of light incidence to the grooves, the condition for the angle θ can be less strict because the groove groups can be extended and thus the number of grooves or generally, surface relief forms, per outcoupling unit be carefully selected.

Figure 10:
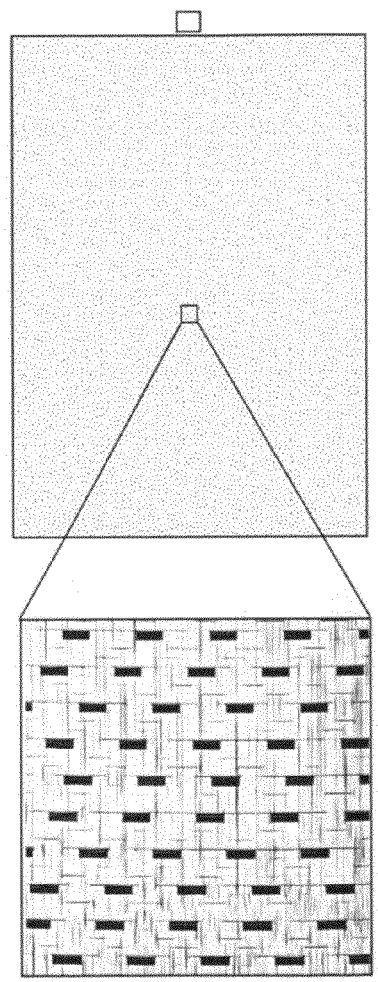
FIG. 10 illustrates experimental result of the performance of one possible lightguide arrangement in accordance with present invention.
Figure 10:
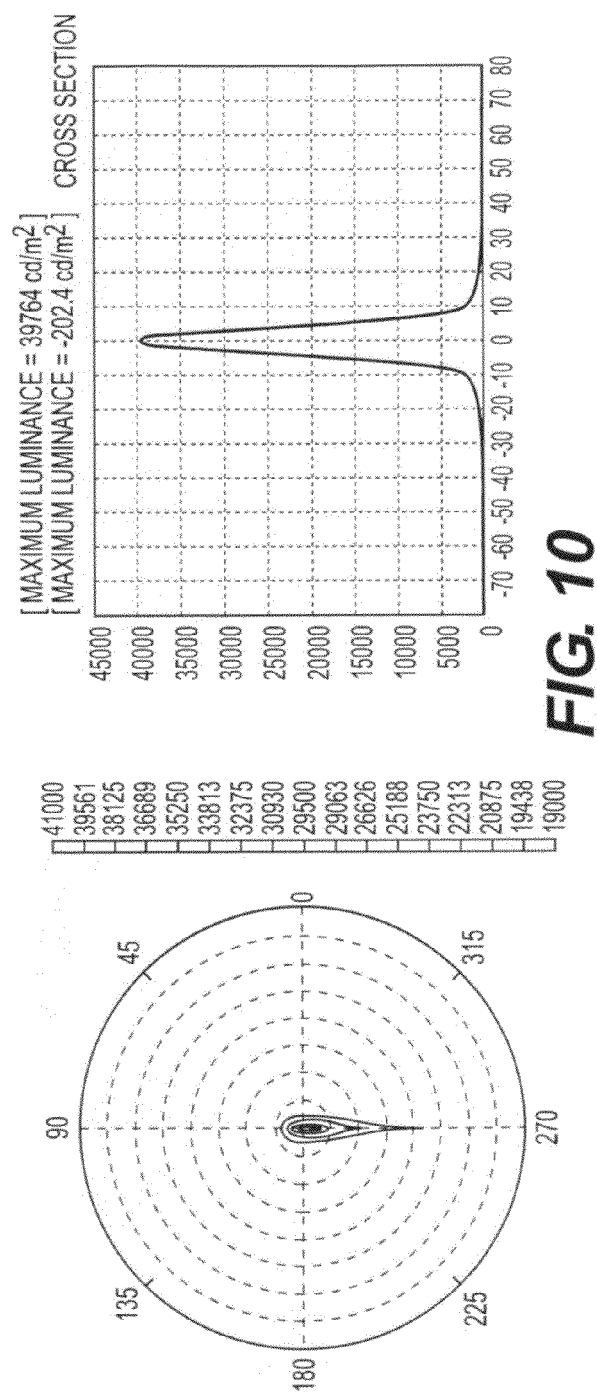

FIG. 10 illustrates experimental results of the performance provided by a lightguide in accordance with one embodiment of the present invention. With this embodiment, very high factor of light directivity may be achieved together with excellent efficiency. The upper microscope figure represents a plurality of outcoupling units, which are radially aligned having curved grating grooves. The lower conoscope figure represents narrow outcoupling angles ±5°. The performance of the real lightguide may even exceed theoretically determined performance, due to higher diffraction efficiency especially with small and large incidence angles.

To manufacture the diffractive outcoupling units and carrier media according to the embodiments of the invention e.g. the processes of lithographic fabrication and/or micro machining for the mastering and injection moulding, roll-to-roll or planar embossing, can be utilized.

In the above analysis the diffractive units many times included blazed grooves as diffractive surface relief profile, but also blazed protrusions or other patterns (e.g. slanted profile) may be fully feasible options depending on the application.

The scope of the invention is determined by the attached claims together with the equivalents thereof. The skilled persons will appreciate the fact that the explicitly disclosed embodiments were constructed for illustrative purposes only, and the scope will cover further embodiments and equivalents that better suit each particular use case of the invention.

The invention claimed is:

1. A lighting device comprising:
a carrier element for transporting light, the carrier element including a surface area and an exit surface area substantially opposite the surface area; and
diffractive units individually comprising a plurality of consecutive diffractive surface relief forms defined on the surface area of the carrier element, wherein:
the diffractive units are individually configured to outcouple light incident thereon via at least two of the plurality of consecutive diffractive surface relief forms;
at least a portion of the incident light penetrates through at least a first diffractive surface relief form of the plurality of consecutive diffractive surface relief forms and reflects toward the exit surface area from at least a second diffractive surface relief form of the plurality of consecutive diffractive surface relief forms;
the surface area of the carrier element comprises a first surface area and a nested second surface area surrounded by the first surface area, wherein the first surface area comprises diffractive surface relief forms aligned in a first direction and the nested second surface area comprises diffractive surface relief forms aligned in a second direction different from the first direction; and
the diffractive units are semi-randomly organized on the carrier element to avoid a Moire effect.

2. The lighting device according to claim 1, wherein the plurality of consecutive diffractive surface relief forms defines a number of slanted grating groove, recess or protrusion profiles on the surface area of the carrier element.

3. The lighting device according to claim 1, wherein at least two consecutive diffractive surface relief forms of the plurality of consecutive diffractive surface relief forms are of substantially the same height.

4. The lighting device according to claim 1, wherein light rays of the incident light on one of the plurality of consecutive diffractive surface relief forms within an incident angle and a conical angle are at least partly outcoupled within an outcoupling angle toward the exit surface area of the carrier element, wherein the incident angle is an angle of the incident light as measured with respect to the surface normal of the carrier element, and wherein the conical angle is an angle of the incident light as measured with respect to a plane that is orthogonal to the surface normal of the carrier element.

5. The lighting device according to claim 1, wherein at least one diffractive surface relief form of the plurality of consecutive diffractive surface relief forms defines a profile selected from a group consisting of: a triangular form, a trapezoidal form, a parallelogram, and an equilateral triangle.

6. The lighting device according to claim 1, wherein the plurality of consecutive diffractive surface relief forms comprise a straight, curved, wavy, or dot-like arrangement.

7. The lighting device according to claim 1, wherein the diffractive units individually comprise at least two substantially parallel diffractive surface relief forms.

8. The lighting device according to claim 1, wherein the carrier element is substantially optically transparent and configured to enable light transmission by substantially total internal reflection.

9. The lighting device according to claim 1, wherein the incident light is received from a light source that is coupled to at least one of the diffractive units.

10. The lighting device according to claim 1, wherein the plurality of consecutive diffractive surface relief forms comprise one or more blazed profiles having a blaze angle of substantially 45 degrees.

11. The lighting device according to claim 1, wherein the plurality of consecutive diffractive surface relief forms comprise one or more blazed profiles having a variable blaze angle between the forms.

12. The lighting device according to claim 1, wherein a blaze angle of a first one of the diffractive units is different from a blaze angle of a second one of the diffractive units that is adjacent to the first one of the diffractive units.

13. The lighting device according to claim 1, wherein the diffractive units comprise first diffractive surfaces, the lighting device further comprises second diffractive surfaces defined on the exit surface area of the carrier element, wherein the second diffractive surfaces are arranged to outcouple light incident on the first diffractive surfaces cooperatively with the first diffractive surfaces to outside the carrier element.

14. The lighting device according to claim 1, wherein the diffractive units comprise five diffractive surfaces with blazed profiles arranged to outcouple incident light rays, the incident angles of which evenly extend between 45 and 90 degrees relative to the surface normal of the carrier element so that the light is outcoupled within an outcoupling angle of 20 degrees relative to the surface normal with coupling efficiency of at least 30 percent between the incident light rays and light outcoupled within the outcoupling angle.

15. The lighting device according to claim 1, wherein the plurality of consecutive diffractive surface relief forms has a form period that is equal to or less than 7 microns.

16. The lighting device according to claim 1, wherein the plurality of consecutive diffractive surface relief forms has a form period that is equal to or less than 5 microns.

17. The lighting device according to claim 1, wherein the plurality of consecutive diffractive surface relief forms has a form period that is greater than 2 microns and less than or equal to 10 microns.

18. The lighting device according to claim 1, wherein the diffractive surface relief forms in the first surface area have a first form period and the diffractive surface relief forms in the nested second surface area have a second form period different from the first form period.

19. The lighting device according to claim 1, wherein the diffractive surface relief forms in the first surface area have a first form shape and the diffractive surface relief forms in the nested second surface area have a second form shape different from the first form shape.

20. The lighting device according to claim 1, further comprising a diffractive sheet or film defined on the exit surface area of the carrier element, wherein the diffractive sheet or film is arranged to outcouple light incident on the diffractive units cooperatively with said diffractive units to outside the carrier element.

21. A diffractive light outcoupling system comprising:
a carrier element including a surface area and an exit surface area substantially opposite the surface area;
a plurality of diffractive units individually comprising a plurality of consecutive diffractive surface relief forms that define a number of blazed or slanted grating profiles on the surface area of the carrier element, wherein:
the consecutive diffractive surface relief forms are arranged to outcouple light incident thereon via at least two diffractive surface relief forms of the plurality of consecutive diffractive surface relief forms;
at least a portion of the incident light penetrates through at least a first diffractive surface relief form of the plurality of consecutive diffractive surface relief forms and reflects toward the exit surface area from at least a second diffractive surface relief form of the plurality of consecutive diffractive surface relief forms;
the carrier element further includes a nested second surface area surrounded by the surface area, wherein the surface area comprises diffractive surface relief forms aligned in a first direction and the nested second surface area comprises diffractive surface relief forms aligned in a second direction different from the first direction; and
the plurality of diffractive units are semi-randomly organized on the carrier element to avoid a Moire effect.

22. A lightguide system comprising:
a lightguide;
an incoupling system for coupling light into the lightguide, wherein said incoupling system comprises a distributor or a diffuser;
an optically substantially transparent carrier element for enabling light propagation therein, the carrier element including a surface area and an exit surface area; and
an outcoupling system comprising a plurality of diffractive units individually comprising a plurality of consecutive diffractive surface relief forms that define a number of blazed or slanted grating profiles on the surface area of the optically substantially transparent carrier element, wherein:
the diffractive units are arranged to outcouple light incident thereon via at least two diffractive surface relief forms of the plurality of consecutive diffractive surface relief forms;
at least a portion of the incident light penetrates through at least a first diffractive surface relief form of the plurality of consecutive diffractive surface relief forms and reflects toward the exit surface area from at least a second diffractive surface relief form of the plurality of consecutive diffractive surface relief forms;
the surface area of the carrier element comprises a first surface area and a nested second surface area surrounded by the first surface area, wherein the first surface area comprises diffractive surface relief forms aligned in a first direction and the nested second surface area comprises diffractive surface relief forms aligned in a second direction different from the first direction; and
the plurality of diffractive units are semi-randomly organized on the carrier element to avoid a Moire effect.

23. The lightguide system according to claim 22, wherein the carrier element further includes a third surface area adjacent to the surface area, the third surface area including locations that are free of diffractive elements.

24. The lightguide system according to claim 22, further comprising a light source coupled to the lightguide and configured to provide the incident light.

25. The lightguide system according to claim 22, wherein a number of diffractive units belonging to the plurality of diffractive units are either independently or in groups aligned in relation to one or more light sources.

26. The lightguide system according to claim 22, wherein the density of diffractive units is arranged to increase on the optically substantially transparent carrier element as a function of distance from a light source.

* * * * *